(12) United States Patent
Ni et al.

(10) Patent No.: US 12,323,567 B2
(45) Date of Patent: Jun. 3, 2025

(54) 3D ARTS VIEWING ON DISPLAY DEVICES

(71) Applicant: Samsung Electronics Co., Ltd., Suwon-si (KR)

(72) Inventors: Saifeng Ni, Santa Clara, CA (US); Madhukar Budagavi, Plano, TX (US); Indranil Sinharoy, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 186 days.

(21) Appl. No.: 18/064,918

(22) Filed: Dec. 12, 2022

(65) Prior Publication Data

US 2023/0199161 A1 Jun. 22, 2023

Related U.S. Application Data

(60) Provisional application No. 63/291,192, filed on Dec. 17, 2021.

(51) Int. Cl.
*H04N 13/117* (2018.01)
*H04N 13/167* (2018.01)
*H04N 13/25* (2018.01)
*H04N 13/368* (2018.01)

(52) U.S. Cl.
CPC ......... *H04N 13/117* (2018.05); *H04N 13/167* (2018.05); *H04N 13/25* (2018.05); *H04N 13/368* (2018.05)

(58) Field of Classification Search
None
See application file for complete search history.

(56) References Cited

U.S. PATENT DOCUMENTS

| | | | |
|---|---|---|---|
| 6,370,267 B1 | 4/2002 | Miller et al. | |
| 6,417,850 B1 | 7/2002 | Kang | |
| 7,134,080 B2 | 11/2006 | Kjeldsen et al. | |
| 10,419,736 B2 | 9/2019 | Lee et al. | |
| 2014/0028662 A1* | 1/2014 | Liao | H04N 13/398 345/419 |
| 2019/0320163 A1* | 10/2019 | Posa | H04N 21/44218 |
| 2022/0174252 A1 | 6/2022 | Haines | |

FOREIGN PATENT DOCUMENTS

| | | |
|---|---|---|
| CN | 107333121 B | 2/2019 |
| CN | 114879442 A | 8/2022 |

* cited by examiner

*Primary Examiner* — Christopher Braniff

(57) ABSTRACT

An apparatus for three dimensional (3D) art viewing includes one or more sensors and a processor operably coupled to the one or more sensors. The processor is configured to detect, using the one or more sensors, a position of a user. The processor is additionally configured to output, for display, an aspect of an image based on the position of the user. The processor is also configured to obtain, using the one or more sensors, movement data associated with a movement of the user. The processor is further configured to apply temporal smoothing to smooth the movement data. In addition, the processor is configured to map the smoothed movement data to a series of view indices. The processor is also configured to change the aspect of the image for display based on the mapped series of view indices.

20 Claims, 18 Drawing Sheets

3D ARTS VIEWING ON DISPLAY DEVICES

CROSS-REFERENCE TO RELATED APPLICATION AND PRIORITY CLAIM

This application claims priority under 35 U.S.C. § 119 (e) to U.S. Provisional Patent Application No. 63/291,192 filed on Dec. 17, 2021, which is hereby incorporated by reference in its entirety.

TECHNICAL FIELD

This disclosure relates generally to display devices and processes. More specifically, this disclosure relates to three-dimensional (3D) arts viewing on display devices.

BACKGROUND

As 3D scanning, 3D modeling, 3D encoding/decoding, 3D display technologies and etc., is further developed, 3D artwork may be displayed in homes rather than only two-dimensional (2D) artwork. In that way users may enjoy 3D art, sculpture, textured paintings, four-dimensional (4D) videos, digital holograms, 3D engineering drawing etc. in an immersive and fun way.

SUMMARY

This disclosure provides for three-dimensional (3D) arts viewing on display devices.

In a first embodiment, an apparatus for three dimensional (3D) art viewing includes one or more sensors and a processor operably coupled to the one or more sensors. The processor is configured to detect, using the one or more sensors, a position of a user. The processor is additionally configured to output, for display, an aspect of an image based on the position of the user. The processor is also configured to obtain, using the one or more sensors, movement data associated with a movement of the user. The processor is further configured to apply temporal smoothing to smooth the movement data. In addition, the processor is configured to map the smoothed movement data to a series of view indices. The processor is also configured to change the aspect of the image for display based on the mapped series of view indices.

In a second embodiment, a method for three dimensional (3D) arts viewing includes detecting, using one or more sensors of an electronic device, a position of a user. The method additionally includes outputting, for display, an aspect of image based on the position of the user. The method also includes obtaining, using the one or more sensors, movement data associated with a movement of the user. The method further includes applying temporal smoothing to smooth the movement data. In addition, the method includes mapping the smoothed movement data to a series of view indices. The method also includes changing the aspect of the image for display based on the mapped series of view indices In a third embodiment, a non-transitory machine readable medium stores instructions that when executed cause a processor to detect, using one or more sensors of an electronic device, a position of a user. The instructions that when executed additionally cause the processor to output, for display, an aspect of image based on the position of the user. The instructions that when executed also cause the processor to obtain, using the one or more sensors, movement data associated with a movement of the user. The instructions that when executed further cause the processor to apply temporal smoothing to smooth the movement data. In addition, the instructions that when executed cause the processor to map the smoothed movement data to a series of view indices. The instructions that when executed also cause the processor to change the aspect of the image for display based on the mapped series of view indices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
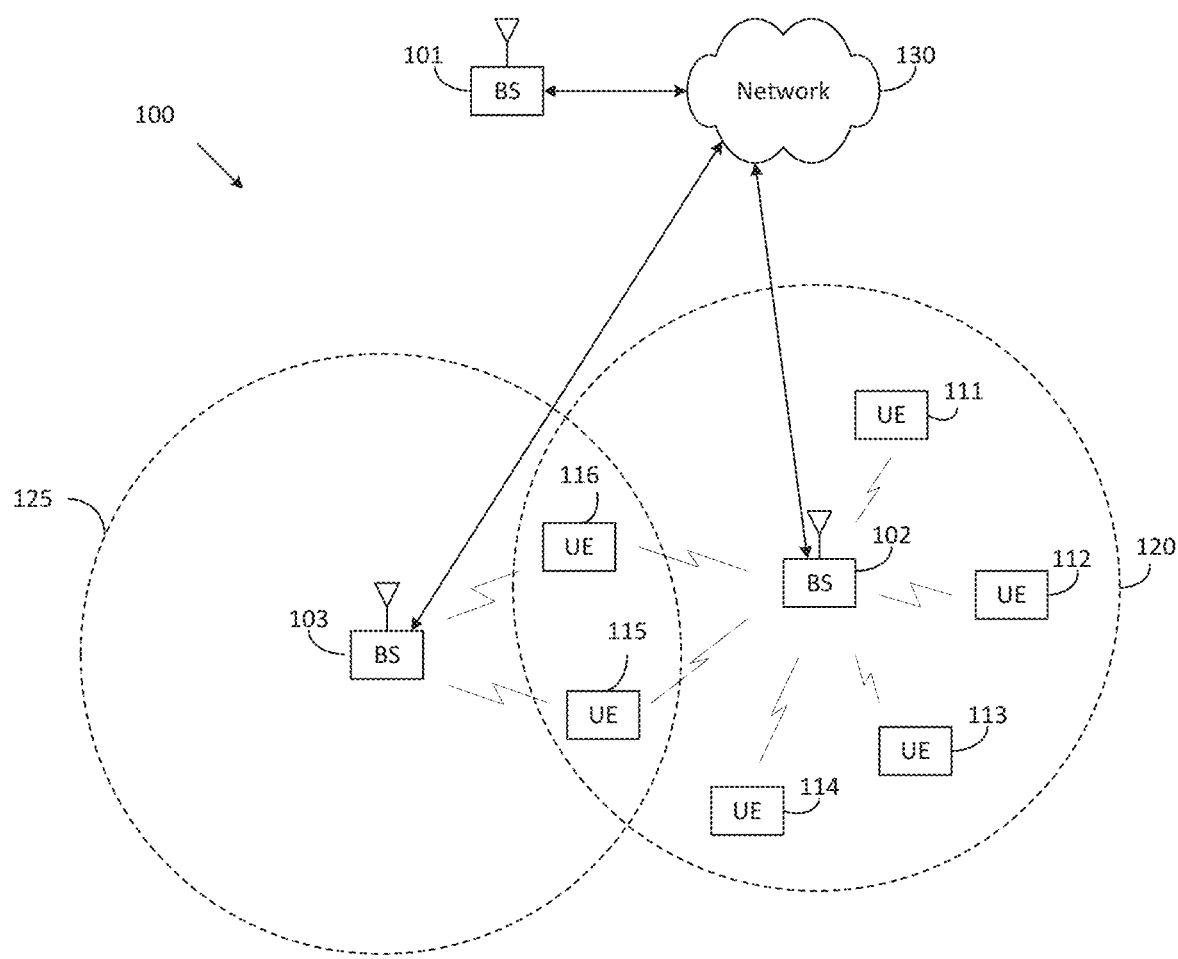
FIG. 1 illustrates an example communication system in accordance with an embodiment of this disclosure.

FIGS. 1 through 15, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Recently, 3D and immersive media content, like the Metaverse, are trending. However, users need to use additional gear such as VR headsets and controllers to experience those media contents, which can exclude some potential customers. 2D screens, like televisions, are still the most popular displays in users' homes. Also, head-mounted displays face discomfort issues, are cumbersome to set up, and do not provide group viewing experiences in the same physical space. These situations create gaps to be filled from the user's standpoint and opportunities to deliver simple solutions for users to enjoy these new experiences on devices that they are most comfortable using.

A platform for immersive extended experiences that can enable customers to experience 3D and immersive applications on 2D displays. Users playing alone or with others in the same physical space can use some smart ways e.g., simple gestures, to interact with the digital contents instead of controllers and headsets.

Figure 2:
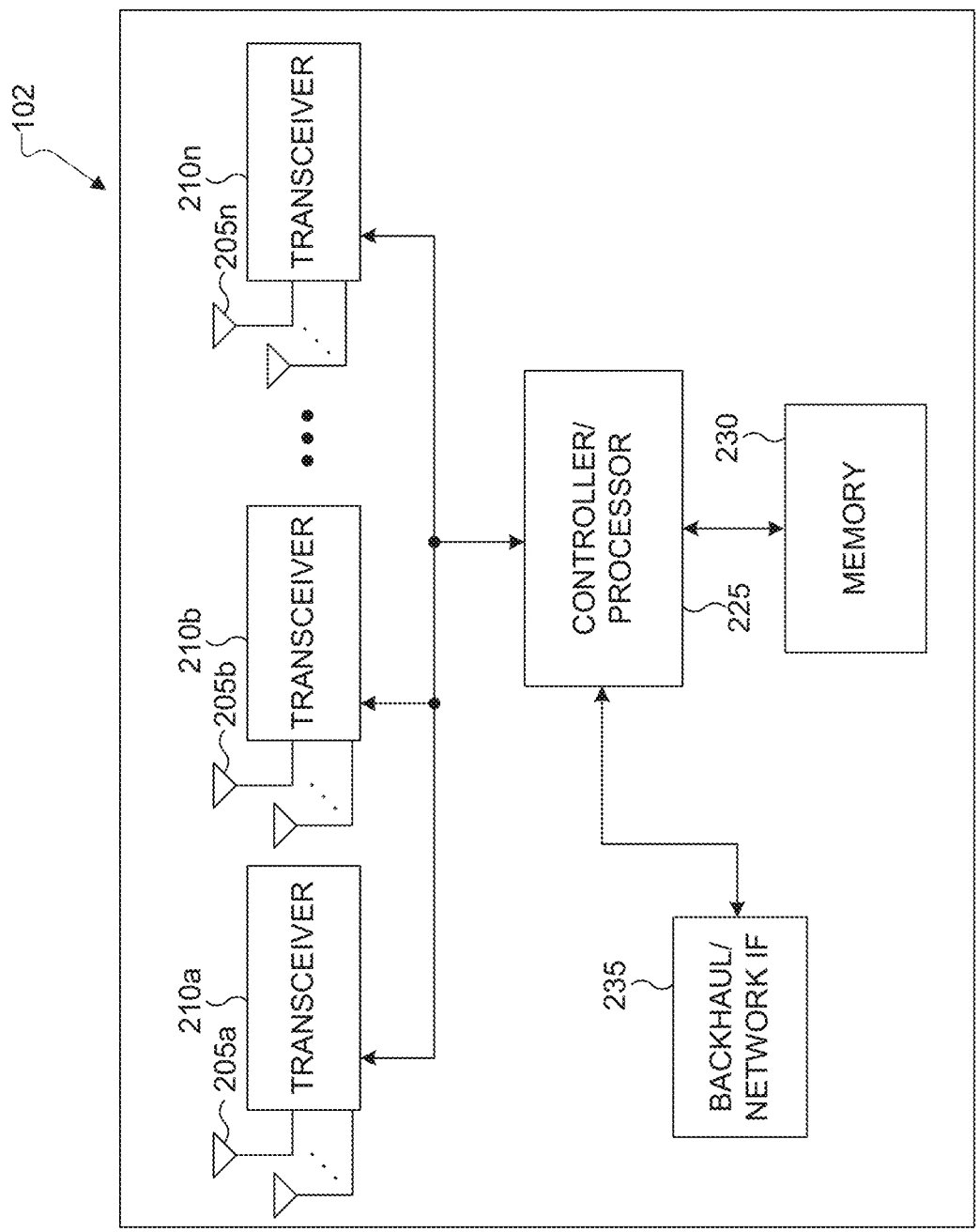
FIGS. 2 and 3 illustrate example electronic devices in accordance with an embodiment of this disclosure.
Figure 3:
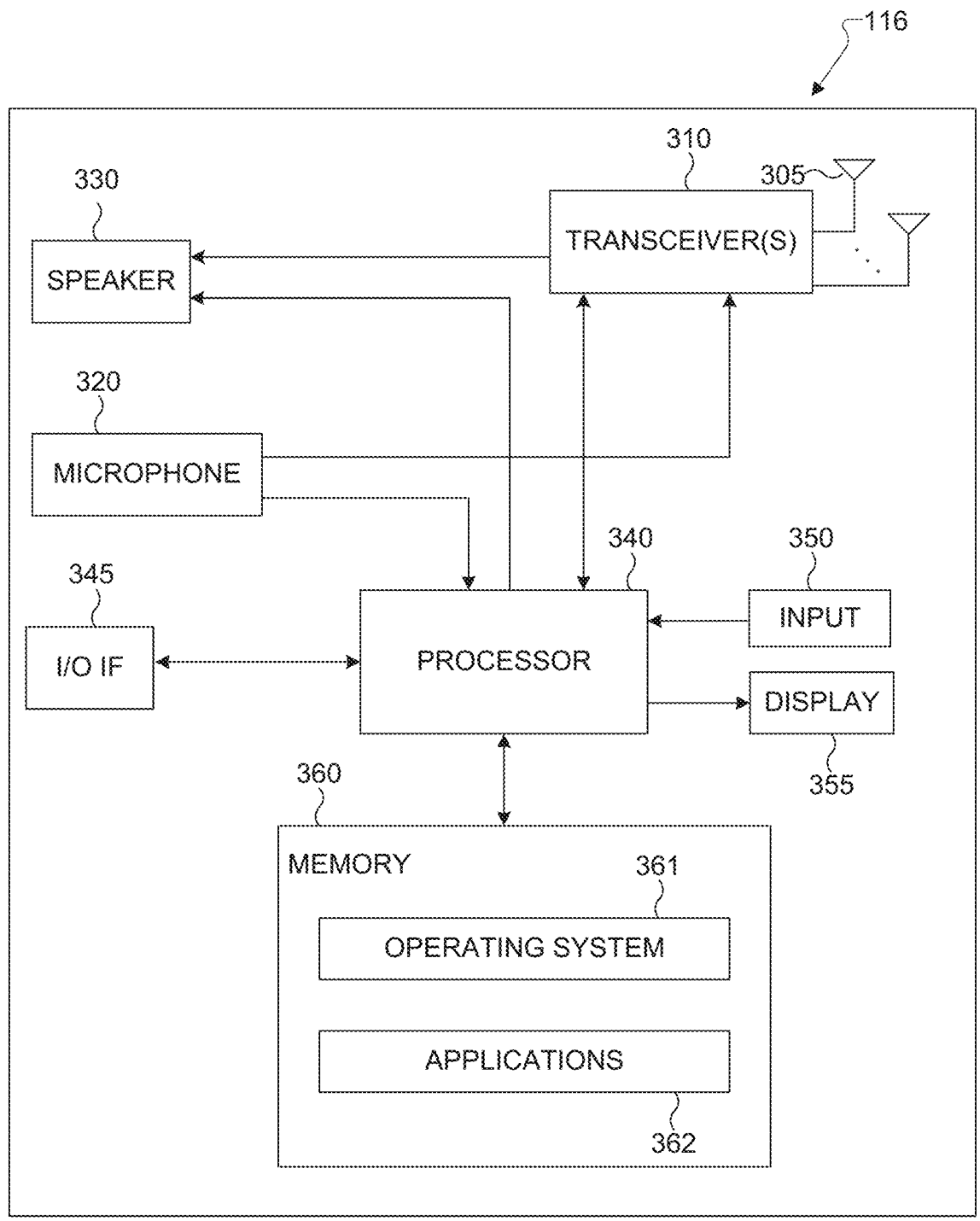

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
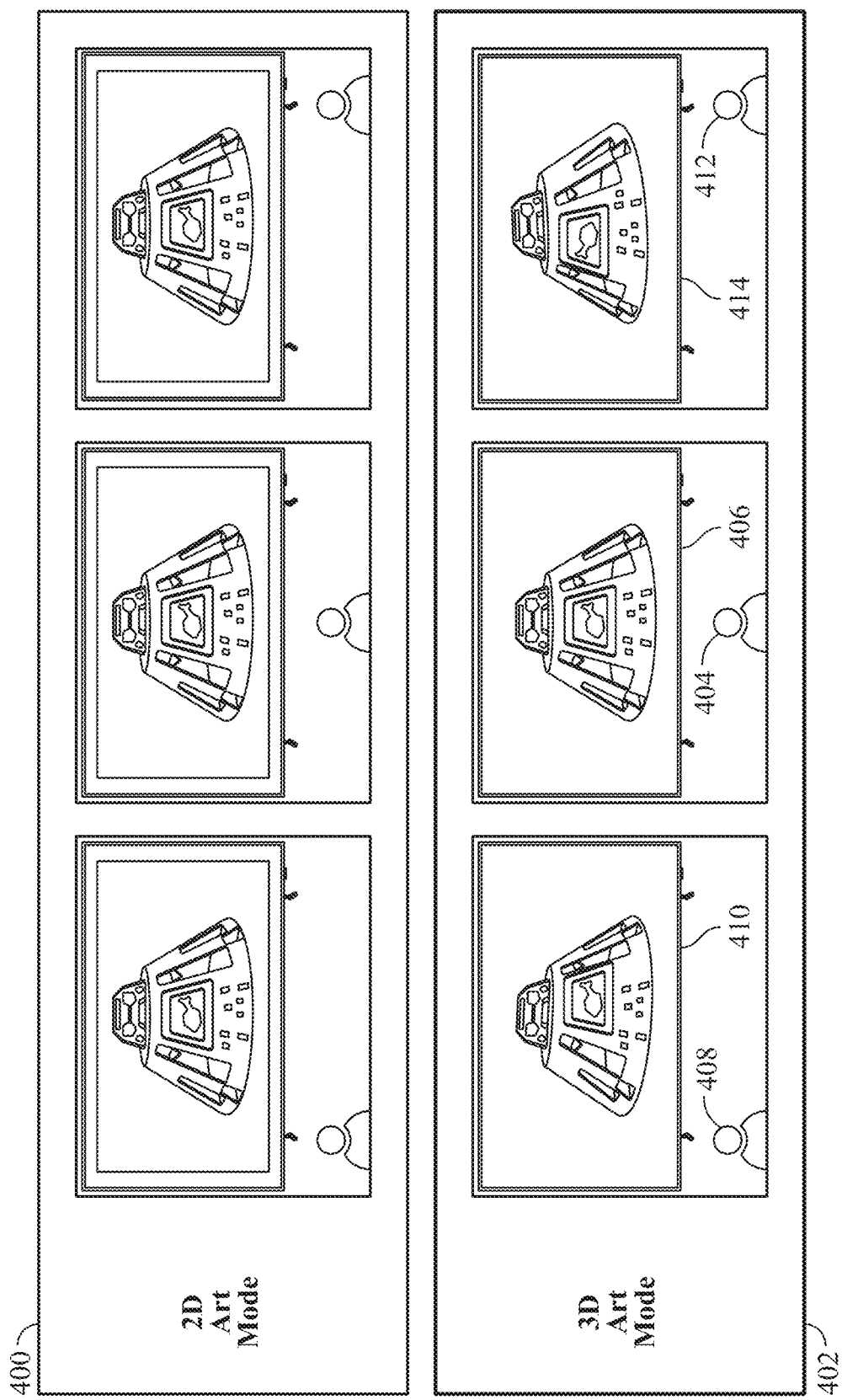
FIG. 4 illustrates an example two-dimensional (2D) art mode and an example three-dimensional (3D) art mode in accordance with this disclosure.

FIG. 4 illustrates an example two-dimensional (2D) art mode 400 and an example three-dimensional (3D) art mode 402 in accordance with this disclosure. The embodiment of the 2D art mode 400 and the 3D art mode 402 illustrated in FIG. 4 are for illustration only. FIG. 4 does not limit the scope of this disclosure to any particular implementation of an art mode.

As shown in FIG. 4, a current art mode for television, including Frame TV, provide a 2D art mode 400 to consumers by showing a high-quality 2D image of artwork. 3D art mode 402, which can also be referred to as AI art mode, can bring immersive 3D experience for users by showing multi-view images of 3D art for display devices such as Frame TV. The 3D art mode 402 can mimic actual walking to different sides of artwork as one would walking through a museum or other real life display. In other words, the 3D art mode 402 can smoothly change views on the artwork on display devices according to a user position. For example, when a user is in a first position 404 or default position, the artwork can be displayed in a default orientation 406. In the first user position 404, the displayed artwork can be presented for the 3D art mode 402 in a similar manner as a presentation in the 2D art mode 400. When a user moves to the left to a second position 408, the artwork can be rotated to the right to show a left side of the artwork in a second orientation 410. When the user moves to the right to a third position 412, the art can be rotated to the left to show a right side of the artwork in a third orientation 414. The 3D art mode 402 can include schemes to guarantee smoothy and continuously changing the view of the artwork between the first through third orientations 406, 410, and 414 according to the relative movement of the user between the first through third positions 404, 408, and 412 to provide a virtual 3D feeling to users.

Although FIG. 4 illustrates example 2D art mode 400 and example 3D art mode 402, various changes may be made to FIG. 4. In addition, the art modes 400 and 402 may be used in any other suitable display process and is not limited to the specific processes described above.

Figure 5:
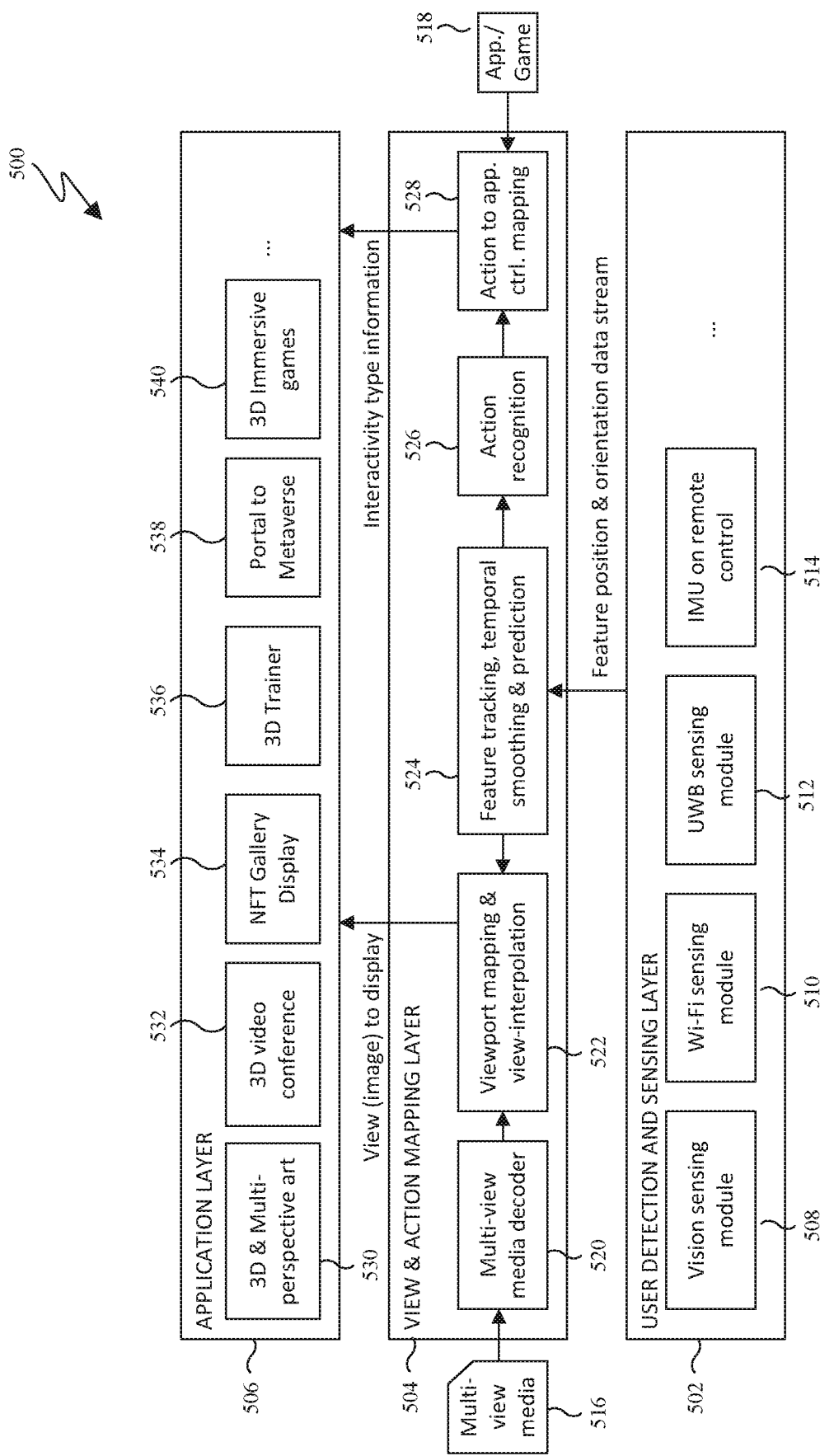
FIG. 5 illustrates an example platform for a 3D art mode in accordance with this disclosure.

FIG. 5 illustrates an example platform 500 for 3D art viewing in accordance with this disclosure. The embodiment of the platform 500 illustrated in FIG. 5 is for illustration only. FIG. 5 does not limit the scope of this disclosure to any particular implementation of an electronic device.

As shown in FIG. 5, platform 500 can provide immersive extended experiences that enable customers to experience 3D and immersive applications on 2D displays. The platform 500 can be designed in a three-layered architecture including a user detection and sensing layer 502, a view and action mapping layer 504, and an application layer 506. 3D artwork can be rendered based on users position and motion. Platform 500 can provide smoothly and continuously changing views of 3D art, which mimics a natural way to consume 3D artwork in a real world setting, such as a museum. Besides that, the technology of platform 500 can be extended to deal with other potential use case on display devices.

The user detection and sensing layer 502 can provide a variety of pluggable sensing modalities like a vision sensing module 508, a Wi-Fi sensing module 510, an ultra-wideband (UWB) sensing module 512, and an inertial measurement unit (IMU) on remote control module 514, etc. for sensing a user position and a user motion. The vision sensing module 508 can use optical sensors to capture a scene including a user in front of the display device. The vision sensing module 508 can identify a user position from the captured scene and determine a movement of the user or motion data between subsequent scene captures. The Wi-Fi sensing module 510 can use a Wi-Fi signal to map a scene including a user in front of the display. The Wi-Fi sensing module 510 can identify a user position in relation to the display and determine movement of the user or motion data between subsequent mapped scenes. The UWB sensing module 512 can transmit radio waves to map a scene including a user in front of the display. The UWB sensing module 512 can identify a user position in relation to the display and determine movement of the user or motion data between subsequent mapped scenes. The IMU on remote control module 514 can communicate with a remote control of the display device to identify a user position. The IMU on the remote control can be used to detect motion of the remote control, which can be used to determine a movement of the user or motion data.

The view and action mapping layer 504 can translate the user position and motion data to a corresponding view for rendering on a display based on the application. The view and action mapping layer 504 can receive multi-view media 516 and application data 518 from a storage of the display device or from a communication module, such as a transceiver, of the display device. The view and action mapping layer 504 can include a multi-view media decoder 520, a viewport mapping and view interpolation module 522, a feature tracking, temporal smoothing, and prediction module 524, an action recognition module 526, and an action to application control mapping module 528. The multi-view media decoder 520 can decode the received multi-view media 516 for processing in the view and action mapping layer 504. For example, the multi-view media 516 can be received as multiple 2D frames and the multi-view media decoder 520 can process the 2D frames into a point cloud or 3D model of an object.

The feature tracking, temporal smoothing, and prediction module 524 can use the user position and motion data to identify specific movements of a user. For example, when multiple users are detected in front of the display a single user can be determined as a "control user". The feature tracking, temporal smoothing, and prediction module 524 can track the control user for modifying the object on the display. The feature tracking, temporal smoothing, and prediction module 524 can also track specific features of a user for controlling the aspect of the object. For example, the user can designate a hand as a control feature to adjust the aspect of the object on the display and the feature tracking, temporal smoothing, and prediction module 524 can track a position and movement of the control feature. The feature tracking, temporal smoothing, and prediction module 524 can also perform temporal smoothing on the data related to the control feature to remove jitters from the data. The feature tracking, temporal smoothing, and prediction module 524 can also predict a future position or future motion of the control feature in order to preprocess an aspect of the object before the actual motion to enhance an aspect change corresponding to the feature movement.

The viewport mapping and view interpolation module 522 can use the user position and motion data to determine a vector of the user in relation to the display. In certain embodiments, the multi-view media 516 is processed in discrete aspects. For example, when the modifiable aspect of the object is a change of orientation, a number of views can be pre-generated and mapped into view indices. The user position and motion data can be mapped to the view indices to determine a suitable aspect of the object for display. The viewport mapping and view interpolation module 522 can also interpolate aspects of the object between the view indices of the user position and motion data. For example, when a user motion is large or quick, the viewport mapping and view interpolation module 522 can operate using the predetermined indices and interpolate the aspect for finer or slower movements. The aspect of the object can be output to the application layer 506.

The action recognition module 526 can detect specific actions related or unrelated to the user position and motion data. For example, the platform 500 could track overall movement of a user for controlling an aspect of the object while using a gesture of the user for activating specific actions related to application data 518. The action to application control mapping module 528 can map the identified action to an application control based on the application data 518. The application control can be used in the application layer 506.

The application layer 506 can provide an assortment of applications 530-540 to be built on top of the bottom two layers, e.g. 3D art mode 402 for one or more displays. Examples of applications provided by the application layer 506 can include a 3D and multi-perspective art application 530, a 3D video conference application 532, a non-fungible token (NFT) gallery application 534, a 3D trainer application 536, a portal to metaverse application 538, a 3D immersive game application 540, etc. The aspect of the multi-view media 516 and the application control of the application data 518 provided from the view and action mapping layer 504 can be used by the respective application 530-540 to change the display. For example, the aspect of the multi-view media and the application control of the application data 518 can be used to change an orientation of an artwork in the multi-perspective art application 530, adjust a view of users in the 3D video conference application 532, switch between different NFTs in the NFT gallery application 534, change an orientation of a yoga teacher in the 3D trainer application 536, activate a portal to the metaverse on the display in the portal to metaverse application 538, control a virtual user movement in the 3D immersive game application 540.

Although FIG. 5 illustrates an example platform 500 for 3D art viewing, various changes may be made to FIG. 5. For example, the number and placement of various components of the platform 500 can vary as needed or desired. In addition, the platform 500 may be used in any other suitable display process and is not limited to the specific processes described above.

Figure 6:
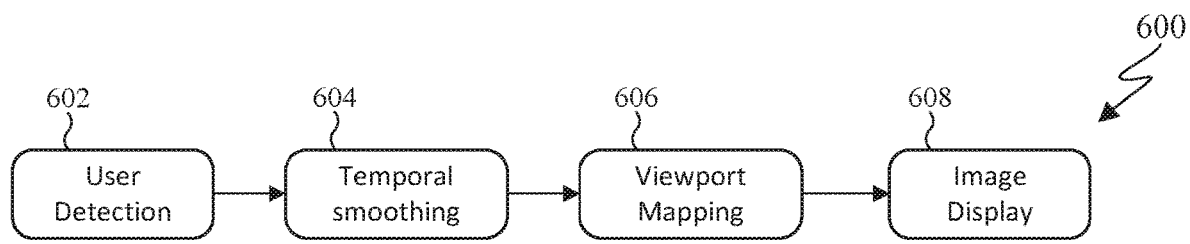
FIG. 6 illustrates an example pipeline for a 3D art mode in accordance with this disclosure.

FIG. 6 illustrates an example pipeline 600 for a 3D art mode in accordance with this disclosure. For ease of explanation, the pipeline 600 of FIG. 6 is described as being performed using the platform 500 of FIG. 5. However, the pipeline 600 may be used with any other suitable system and any other suitable electronic device.

As shown in FIG. 6, pipeline 600 can extend 3D and immersive experiences on 2D displays. In certain embodiments, the media content can be generated in order for 3D artwork to be represented by N images/views. The media content for 3D display can be generated from multiple 2D images captured from multiple angles around a physical artwork with a single camera. In certain embodiments, the media content can be generated using advanced AI technology to synthesize/interpolate new views from one or more 2D images. Once the content is generated, the immersive 3D ART MODE can be displayed by following the pipeline.

The platform 500 can perform user detection 602. In certain embodiments, the user detection 602 can use camera/radio frequency (RF) sensing (UWB, Wi-Fi, etc.), such as sensors used by the user detection and sensing layer 502, to detect positions of a user with respect to the sensor. In certain embodiments, the sensor can be placed at a center of a display device. The user detection 602 can identify whether to operate in a single user scenario or multiple user scenario. For multiple user scenario, different strategies can be implemented to drive the changing an aspect of a displayed object. For example, one strategy could pick the nearest person as a control user. Details of multi-user mode are discussed below.

In certain embodiments, the UE can perform temporal smoothing 604 on the motion data. For example, the temporal smoothing 604 can be performed by the feature tracking, temporal smoothing, and prediction module 524 in the view and action mapping layer 504. Some traditional detection methods or neural network based methods usually produce some detection errors, which may result in jittering problem especially with a large number of views. Temporal smoothing 604 can be applied to smooth the detection results of the motion data. Methods for temporal smoothing 604 can include traditional methods like simple moving average, weighted moving average, simple exponential moving method, double exponential moving method, holt-winters method, Kalman filter, etc., and neural network based methods. Different use cases have different use scenario and requirements, which can dictate a temporal smoothing strategy. The method for temporal smoothing 604 can also be based on a number of views and user motion patterns, e.g., velocity, periodic, etc.

In certain embodiment, the platform 500 can perform viewport mapping 606. For example, the viewport mapping 606 can be performed by the viewport mapping and view-interpolation module 522 in the view and action mapping layer 504. The user position and motion date can be mapped to view indices. For example, a display can show a left view of an object as a user moves to a left side of the display device and can show a right view as a user move to a right side of the display device. The viewport mapping 606 can normalize the detected user position x, where 0 can correspond to a left most position and 1 can correspond to a right most position. If a red, green, blue (RGB) camera is used for user detection 602, 0 can be a left side of the image and 1 can be a right side of the image. The depth value can be normalized to account for user motion in more than one direction. For example as the user moves closer to the display, lateral movement of the user creates a larger change of an orientation or aspect of the object. According to the number of views N, the viewport mapping can set the step s to switch the views, e.g.

$$s = \frac{1}{N} * K,$$

where K is used to add some boundary protection, the viewport mapping 606 can set K=0.8. Initially, a middle view $v_m$ can be displayed. For example, for N views of the object, $v_m$=N/2. In certain embodiments, the viewport mapping can set the initial view as a user favorite view or can set the initial view according to the initial position of the user. The first detected user position can be set to the center pivot $x_p$, which is mapped to a center view. As user moves to x, the viewport mapping 606 can calculate a view index using a position-based view update algorithm. For example, the position-based view update algorithm can be expressed as $v_i = v_m + (x - x_p)/s$.

During the viewport mapping 606, a user may choose to re-center the view. The details of the re-center are given in the user re-centering algorithm. If detection fps is slower than the render flash rate, e.g., user moves fast, the new view index is much larger than a current view index. Instead of directly updating the view index to be $v_i$, the viewport mapping 606 can gradually update the view index from the current view index to updated view index, to reduce a jumping feeling. The viewport mapping 606 can maintain a queue Un to store the imaged views mapped from user motion. If the given views are not evenly sampled, the viewport mapping 606 can also map to an adaptive view update according to the metadata information of the given images/views. The viewport mapping 606 can also synthesize or interpolate new views from the existing view to enhance the viewing experience.

| Initialization | : $v_c \leftarrow -1$, $x_p = 0.5$, $v_n$ is a queue, $v_m \leftarrow$ N/2 |
|---|---|
| Input | : x, N |
| 1 | : if $v_c == -1$:then |
| 2 | :    $v_c = v_m$ |
| 3 | :    $x_p = x$ |
| 4 | : end if |
| 5 | : start position based view update($v_n$, x, N, $x_p$) |
| 6 | : start recenter control ($v_n$, x, $x_p$, $v_m$) |
| 7 | : while ON:then |
| 8 | :    if $v_n$ is not empty:then |
| 9 | :       if $v_n$.front( ) < $v_c$:then |
| 10 | :          $--v_c$ |
| 11 | :       else if $v_n$.front( ) > $v_c$:then |
| 12 | :          $++v_c$ |
| 13 | :       end if |
| 14 | :       if $v_n$.front( ) == $v_c$:then |
| 15 | :          $v_n$.pop_front( ) |
| 16 | :       end if |
| 17 | :    end if |
| 18 | : end while |

VIEW MAPPING ALGORITHM

| Initialization | : |
|---|---|
| Input | : N, $v_n$, x, $x_p$ |
| 1 | : while ON:then |
| 2 | :    $v_i$ = calculate_view_index(x, $x_p$, N) |
| 3 | :    if $v_n$ is empty or $v_n$.back( )! = $v_i$:then |
| 4 | :       push $v_i$ to queue $v_n$ |
| 5 | :    end if |
| 6 | : end while |

POSITION BASED VIEW UPDATE ALGORITHM

| Initialization | : |
|---|---|
| Input | : $v_n$, x, $x_p$, $v_m$ |
| 1 | : while ON:then |
| 2 | :    if recenter:then |
| 3 | :       clear $v_n$ |
| 4 | :       $v_c = v_m$ |
| 5 | :       $x_p = x$ |
| 6 | :    end if |
| 7 | : end while |

USER RE-CENTERING ALGORITHM

The platform 500 can perform image display 608 where the view of the object is presented on the display device. The image display 608 can be performed by the applications 530-540 in the application layer 506.

In certain embodiments, when more than one person is detected in the user detection 602, a multi-user modes can be selected to determine a control user. For example, the user detection 602 can detect position for each of the user in front of the display and can determine a nearest person to the sensor. In certain embodiments, a most-centered user can be selected as a control user. Display views of 3D art corresponding to the position of the control user. For example, the object is displayed in a left view if the control user is standing left of center, and the object is displayed in a right view if control user is standing right of the center.

In certain embodiments, the user detection 602 can detect the multiple users in front of the display device and one of the users is selected as a control user. An option can be provided to switch the control user to another user other than the user selected in the user detection 602. After the other user is selected for tracking, the user detection 602 can tracking the other user.

In certain embodiments, the user detection 602 can detect a largest movement from the users to control the viewer. In certain embodiments, the user detection 602 can provide a user option to pick a control user.

When a control user moves out of range of the sensors or is obstructed from the sensors, the user detection 602 selected a new user as a control user based on any of the previously described methods. For example, the control user is no longer interested in the displayed object, the control user can be manually changed to a different user still interested in the displayed object.

In certain embodiments, the user detection can use gestures to flip through different views of 3D artwork on the display device, which gives a rotating type of experience. In certain embodiments, the user detection 602 can use the TV remote to act as a controller to switch views. For example, an IMU in the TV remote can be used to track movement or gestures of the user.

Although FIG. 6 illustrates an example pipeline 600 for a 3D art mode, various changes may be made to FIG. 6. For example, For example, while shown as a series of steps, various steps in FIG. 6 may overlap, occur in parallel, or occur any number of times.

Figure 7A:
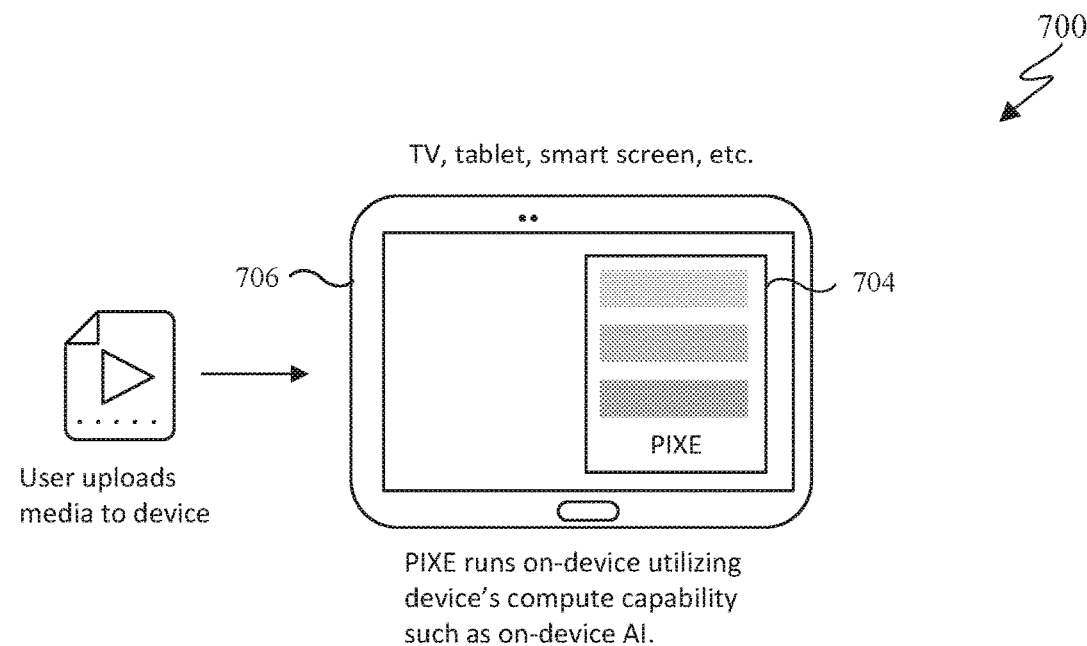
FIGS. 7A and 7B illustrate example environments for running the platform for 3D art mode in accordance with this disclosure.
Figure 7B:
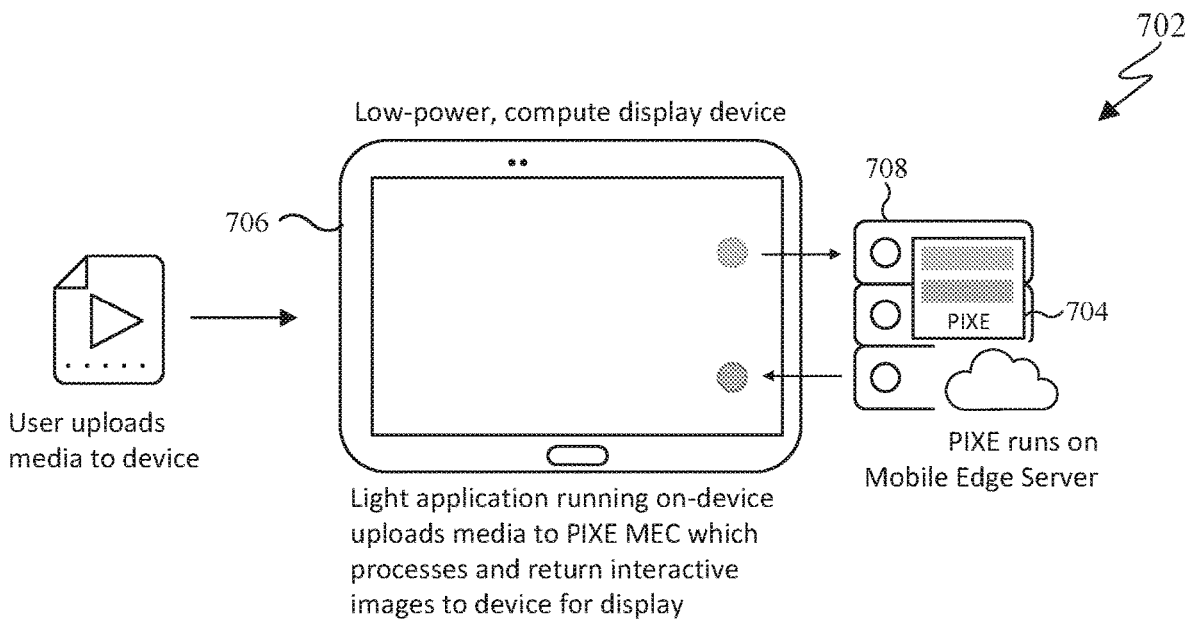

FIGS. 7A and 7B illustrate example environments 700 and 702 for running the platform for 3D art mode in accordance with this disclosure. The embodiments of the environments 700 and 702 illustrated in FIGS. 7A and 7B are for illustration only. FIGS. 7A and 7B do not limit the scope of this disclosure to any particular implementation of an electronic device.

As shown in FIGS. 7A and 7B, an application 704 for the platform 500 can be run across multiple devices 706 having various compute capabilities and power-constraints. While the application 704 can run on-device in products with enough resources, the modular architecture of the application 704 can allow compute-intensive modules to be executed on mobile edge servers 708 for resource-constraint devices.

Although FIGS. 7A and 7B illustrates example environments 700 and 702 for running the platform 500 for 3D art mode, various changes may be made to FIGS. 7A and 7B. In addition, the platform 500 may be used in any other suitable environments and is not limited to the specific embodiments described above.

Figure 8:
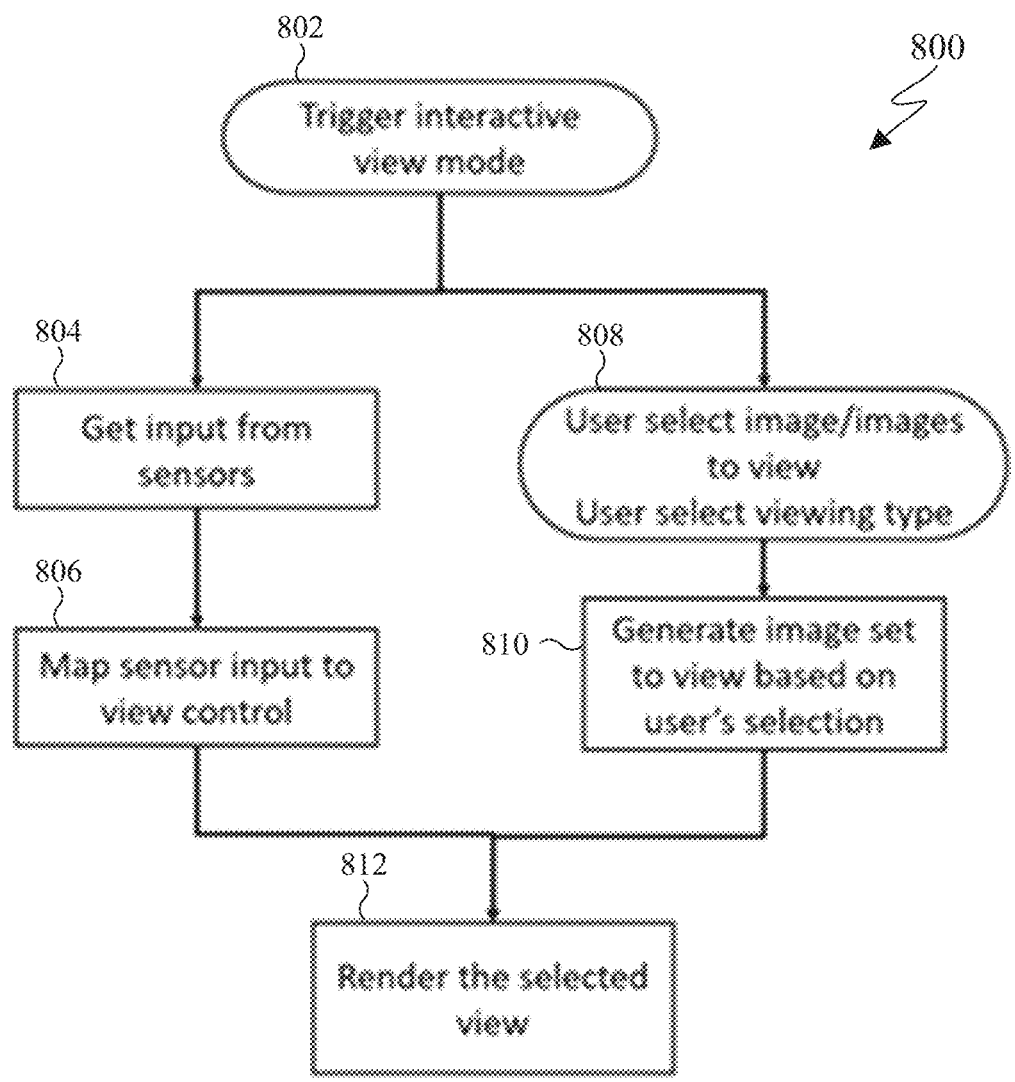
FIG. 8 illustrates an example method for an artificial intelligence (AI) art mode according to this disclosure.

FIG. 8 illustrates an example method 800 for an artificial intelligence (AI) art mode according to this disclosure. For ease of explanation, the method 800 of FIG. 8 is described as being performed using the platform 500 of FIG. 5. However, the method 800 may be used with any other suitable system and any suitable electronic device.

As shown in FIG. 8, The platform 500 can trigger an interactive view mode on a display in operation 802. An AI art mode can be triggered as an extension of 2D art mode, which creates more options for user to display the artworks interactively. However, platform 500 is not limited to the AI art mode and other interactive view modes can be selected or triggered.

The platform 500 can receive input from sensors in operation 804. The input sensors can include optical sensors, Wi-Fi sensors, UWB sensors, IMU, etc. The user detection and sensor layer 502 can be utilized to determine user position and motion data. The platform 500 can map the user position and motion data to the view control in operation 806. The view control can be determined based on the modules 520-528 in the view and action mapping layer 504.

The platform 500 can receive a user selection of one or more images and select a viewing type in operation 808. The viewing type can be an orientation or other aspect of an object. The viewing type can be selected for images individually or can be selected for the images as a group. The platform 500 can generate an image set for the one or more views based on a user selection in operation 810. The image set can be different aspects of a single image or different aspect of multiple images.

The platform 500 can render a view of the object in operation 812. The view of the objects can be the sensor-driven view from operation 806 or the user selected view from operation 810. The method 800 can repeat operations 804 and 806 or operations 808 and 810 to update the rendered view. In certain embodiments, a first rendered view can be generated using operations 804 and 806 and a subsequent view can be generated using operations 808 and 810. In certain embodiments, a first rendered view can be generated using operations 808 and 810 and a subsequent view can be generated using operations 804 and 806.

Although FIG. 8 illustrates one example of a method 800 for an AI art mode, various changes may be made to FIG. 8. For example, while shown as a series of steps, various steps in FIG. 8 may overlap, occur in parallel, or occur any number of times.

Figure 9A:
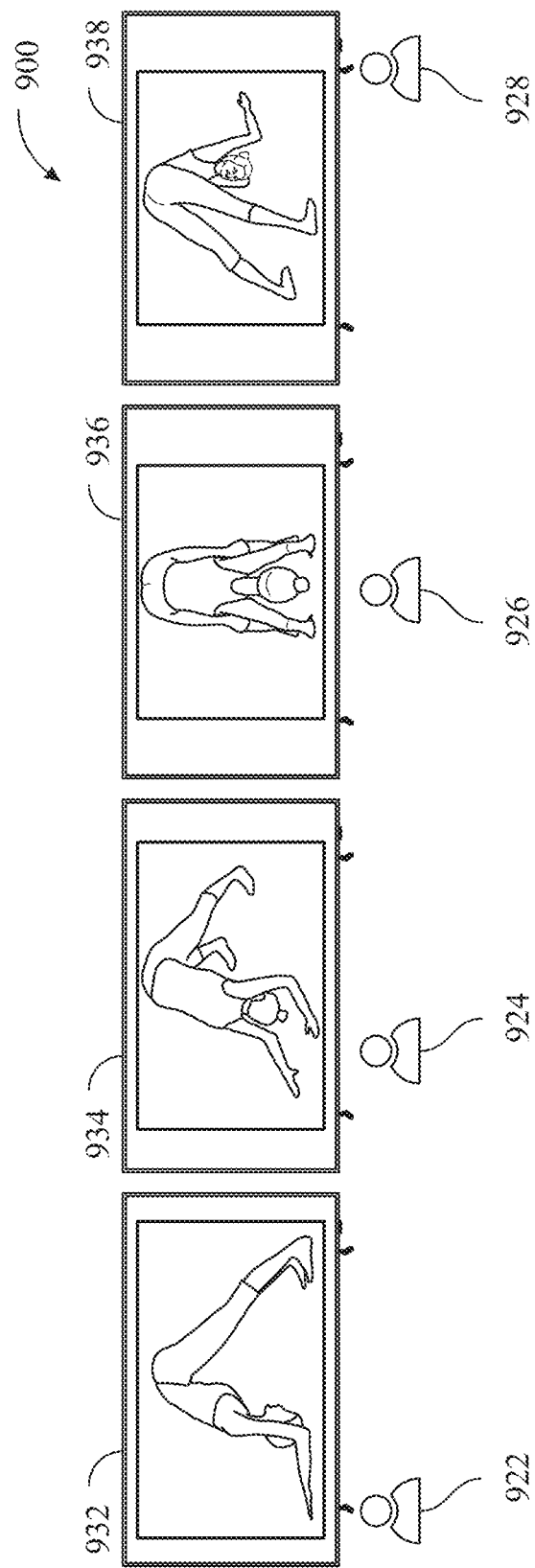
FIGS. 9A through 9K illustrate an example use cases in accordance with this disclosure.
Figure 9B:
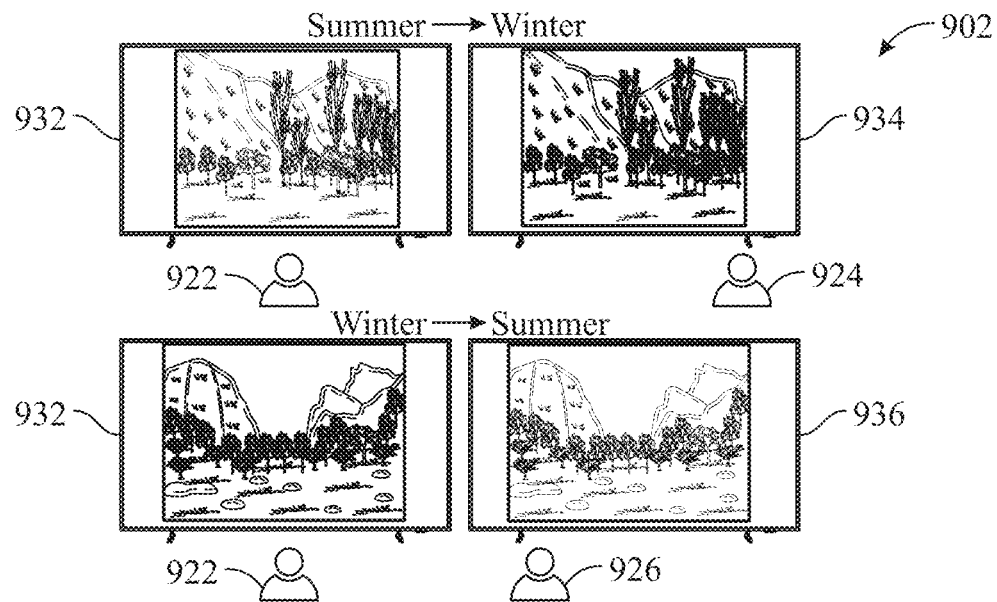
Figure 9C:
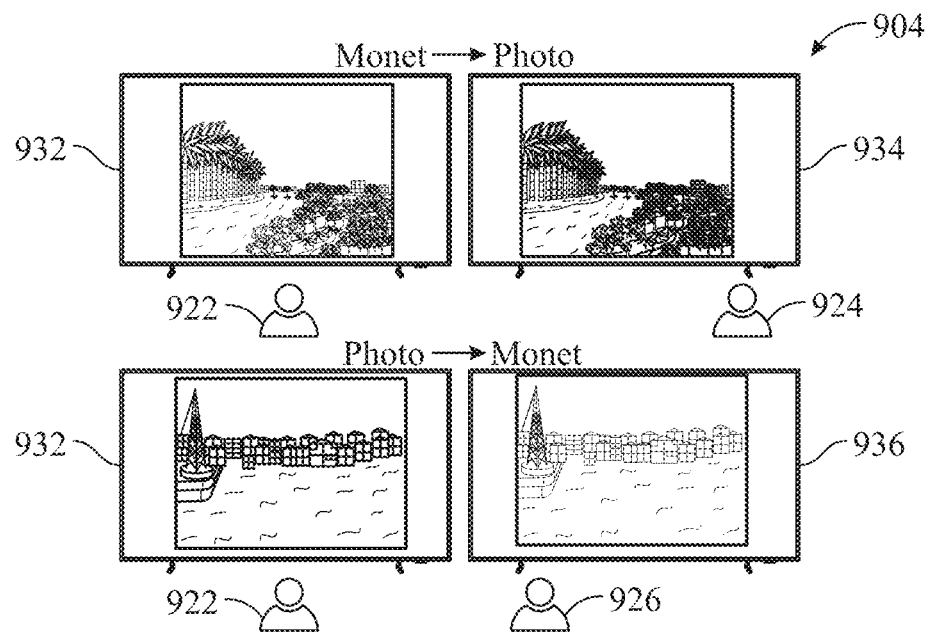
Figure 9D:
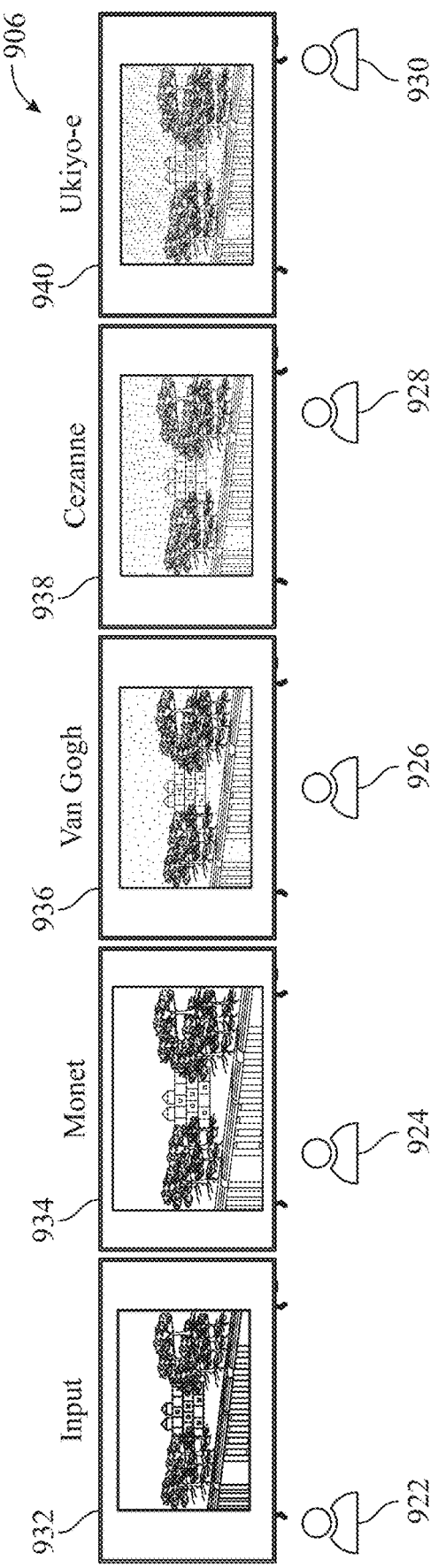
Figure 9E:
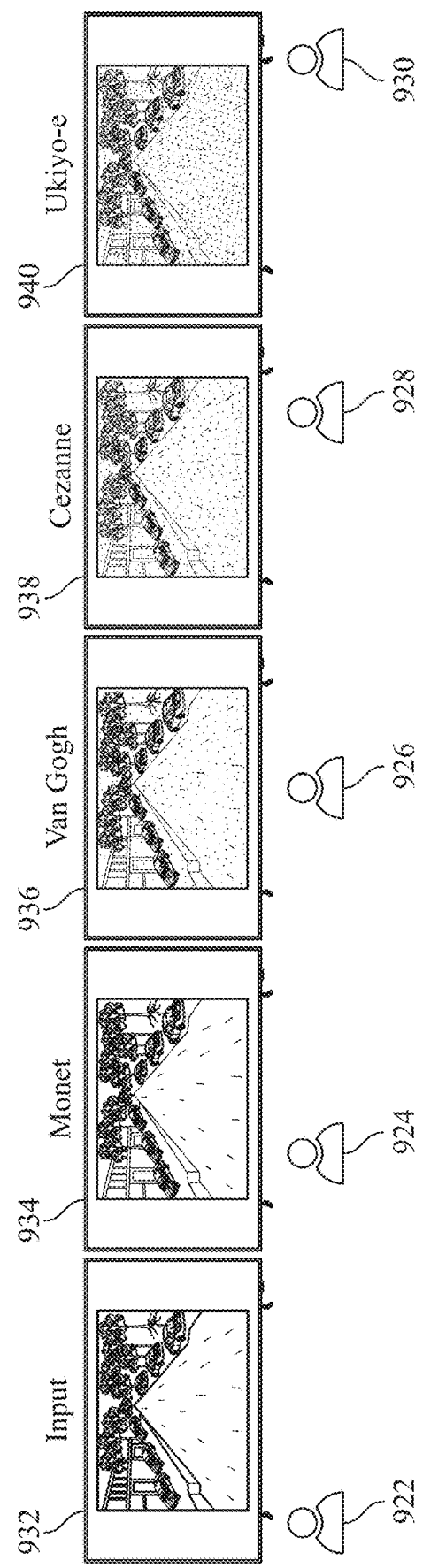
Figure 9F:
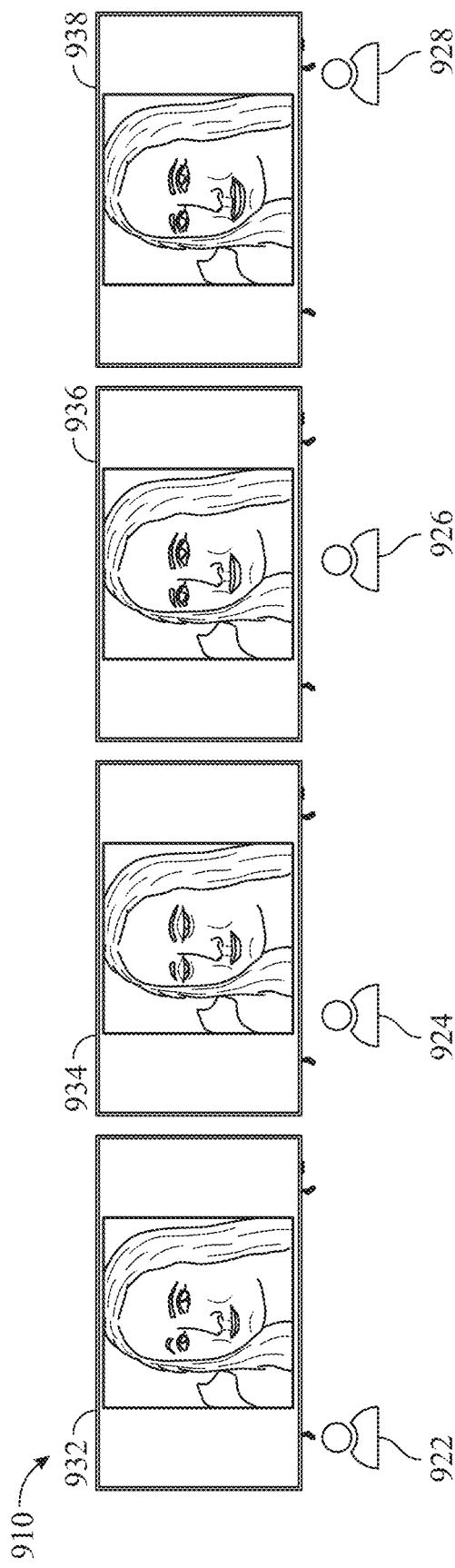
Figure 9G:
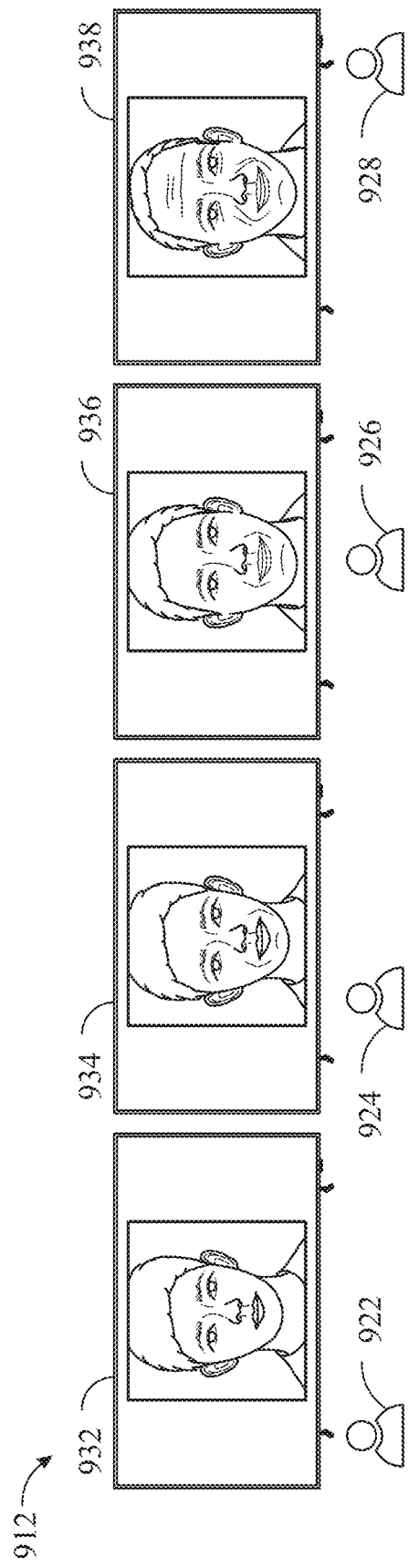
Figure 9H:
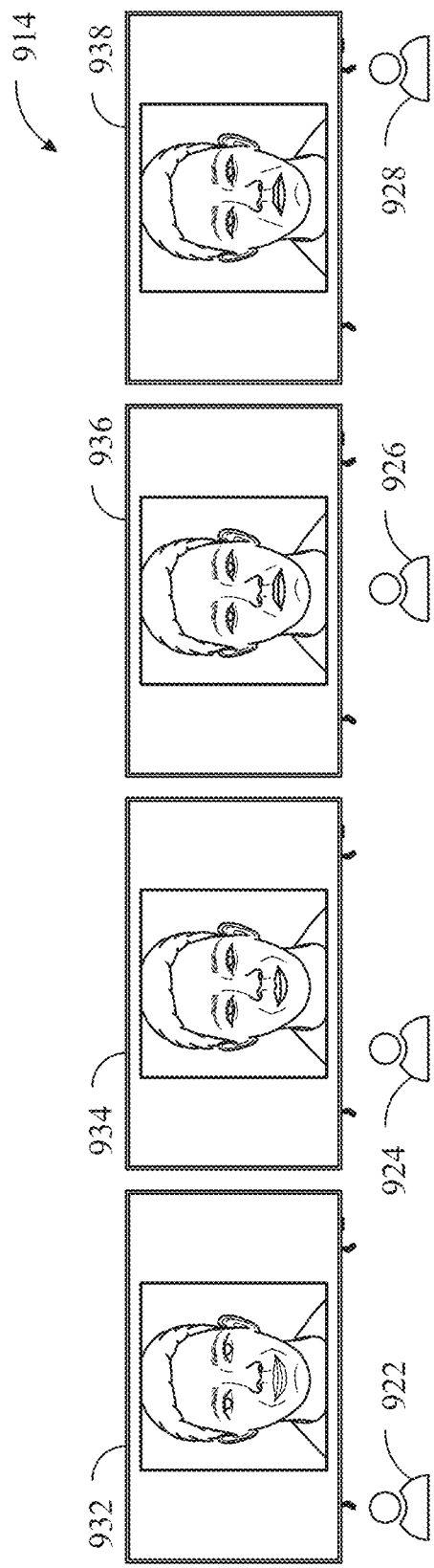
Figure 9I:
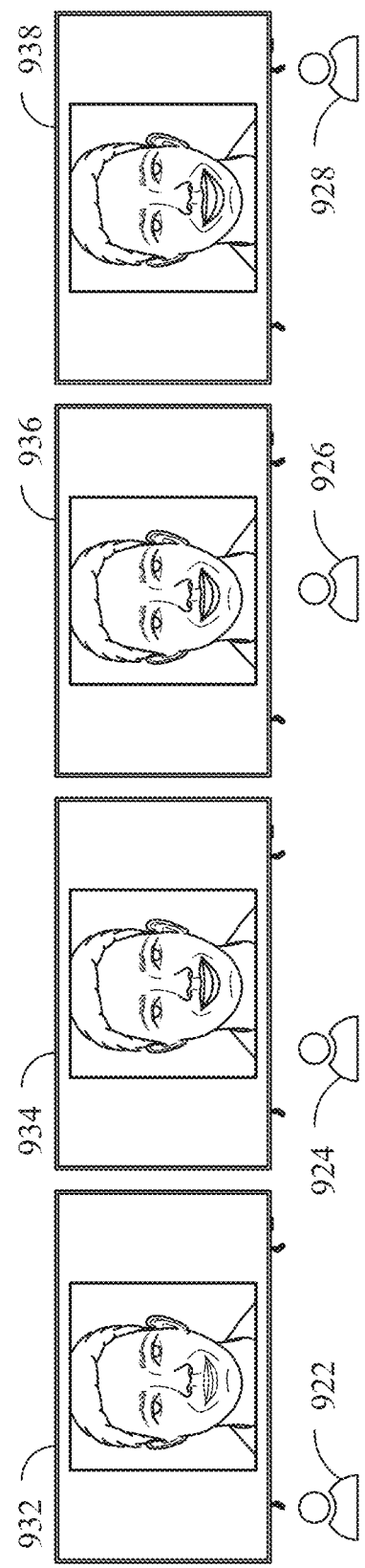
Figure 9J:
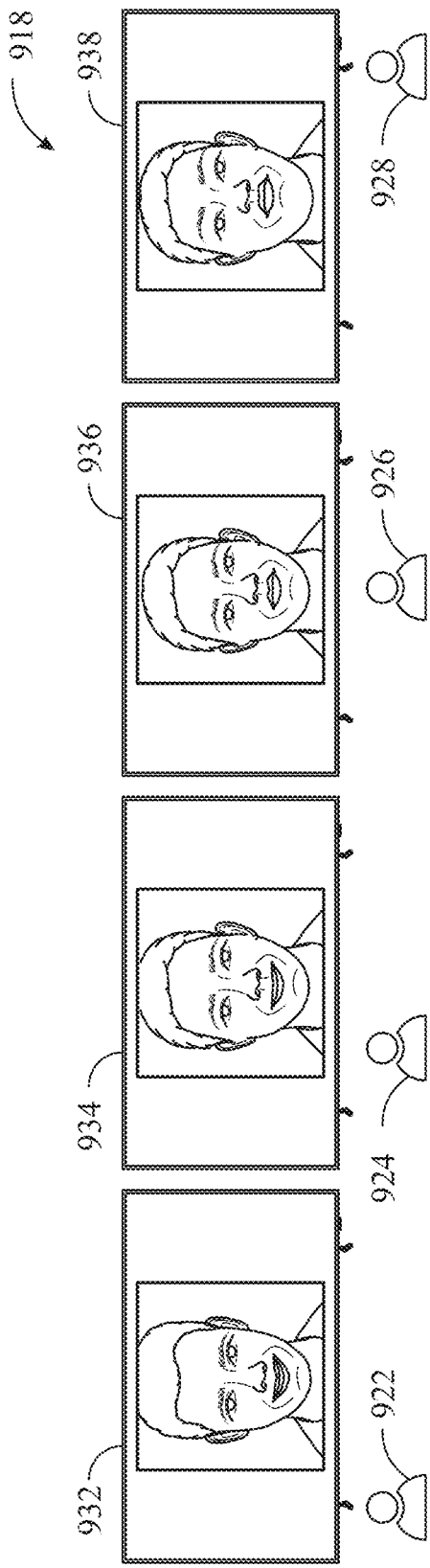
Figure 9K:
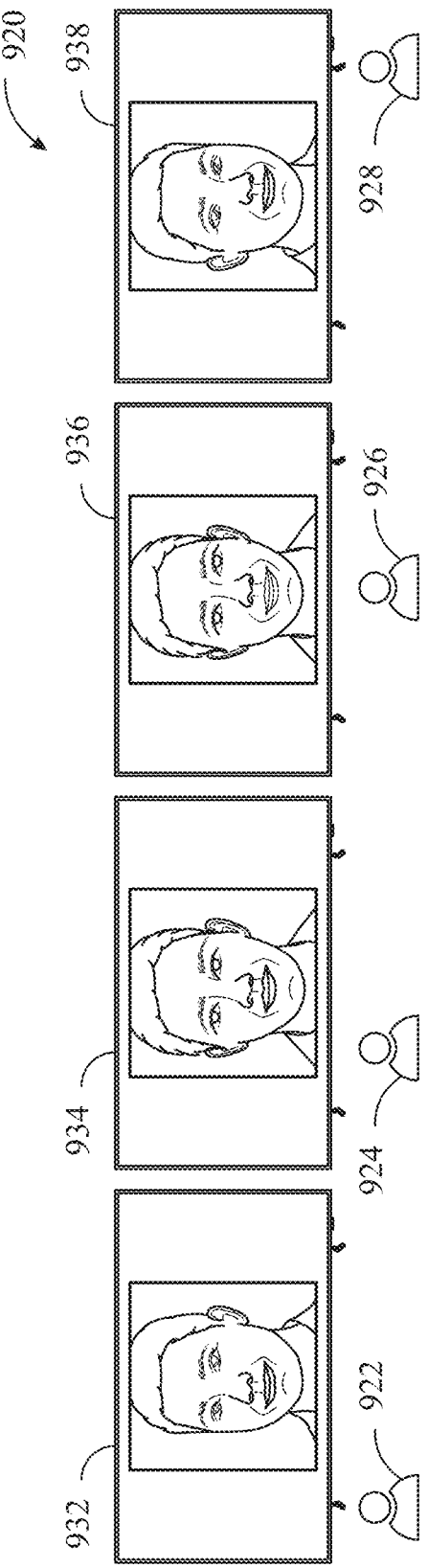

FIGS. 9A through 9K illustrate an example use cases 900-920 in accordance with this disclosure. In particular, FIG. 9A illustrates an example object rotation use case 900, FIG. 9B illustrates an example season change use case 902, FIG. 9C illustrates an example photo-paint conversion use case 904, FIGS. 9D and 9E illustrates example photo-artist conversion use cases 906 and 908, FIG. 9F illustrate an example animate speech use case 910, FIG. 9G illustrates an example age progression use case 912, FIG. 9H illustrates an example expression change use case 914, FIG. 9I illustrates an example smile change use case 916, FIG. 9J illustrates an example vertical face rotation use case 918, and FIG. 9K illustrates an example horizontal face rotation use case 920. The embodiments of the use cases 900-920 illustrated in FIGS. 9A through 9K are for illustration only. FIGS. 9A through 9K do not limit the scope of this disclosure to any particular implementation of an electronic device.

As shown in FIGS. 9A through 9K, the user positions 922-930 can control the aspect 932-940 of the object on the display. As the user moves between positions 922 to 930, the platform 500 can detect the movement and adjust between aspects 932-940 accordingly.

As show in FIG. 9A, the platform 500 can be extended for different lifestyle use cases 900. For example, fitness instruction, such as example yoga poses of an instructor, can be seen from multiple directions depending on a user input, e.g., viewer position, gaze direction, and a simple gesture. When the user is in a first position 922, the first aspect 932 of the yoga pose is displayed, which is a side view. When the user moves to a second position 924, the yoga pose is displayed in a second aspect 934 rotated to the left. When the user is at the third position 926, the instruction is shown in the yoga pose from third aspect 936 or viewed from the front side. When the user is at the fourth position 928, the yoga pose can be viewed from rotated further left in a fourth aspect 938. Also, sports scenes can be captured from multiple angles and the platform 500 may allow viewing the sport scene from different views based on interactive controls.

As shown in FIG. 9B, the platform 500 can use the position-based or motion-based technique to switch the image/painting between different seasons. When the user is at the first position 922, the image is presented as taken during the summer as a first aspect 932. When the user moves to the second position 924, the platform 500 can either use a pre-generated image or use another image modification process, such as AI generation, to display the second aspect 934 of the image during the winter. In certain embodiments, the user can move to a third position 926 that is in the opposite direction of the first position 922 from the second position 924 and the platform 500 can move backwards through the seasons to a third aspect 936.

As shown in FIGS. 9C-9E, the platform 500 can use the position-based or motion-based technique to convert photo to different styles of paints. In certain embodiments, moving between a first position 922 and a second position 924 can change the image from a painting as a first aspect 932 and a photograph as a second aspect 934. Moving from a first position 922 to a third position 926 in a direction opposite of the second position 924 can cause the platform 500 to reverse the first aspect 932 to a third aspect 936. As shown in FIGS. 9D and 9E, more than two type of painting styles can be used for aspects 932-940, where the user can move between corresponding positions 922-930 to view an image in each painting style.

As shown in FIG. 9F, the platform 500 can use the position-based or motion-based technique to generate live animation of art pieces. As a user moves between positions 922-928, the platform 500 can modify an expression on an artwork for each aspect 932-938. For example, the platform 500 can modify an image to increasingly smile as aspects 932-938 as the user moves from a first position 922 to a fourth position 928.

As shown in FIG. 9G, the platform 500 can use the position-based or motion-based technique to visualize the age progression. As a user moves between position 922-928, the platform 500 can artificially age an object between perspectives 932-938. While the illustrative example is aging of a person, the platform 500 can also show aging or deterioration of animals and inanimate objects.

As shown in FIGS. 9H and 9I, the platform 500 can use the position-based or motion-based technique to change an expression. As a user moves between positions 922-928, the platform 500 can artificially change an expression on a face as the aspects 932-938. For example, FIG. 9H shows an expression change from neutral in a first aspect 932 to sad in a fourth aspect 938 and FIG. 9I shows an expression change from neutral in a first aspect 932 to happy in a fourth aspect 938.

As shown in FIGS. 9J and 9K, the platform 500 can use the position-based or motion-based technique to rotate a portrait face. As a user moves between positions 922-928, the platform 500 can rotate a face as the aspects 932-938. For example, FIG. 9H shows an expression a vertical rotation for aspects 932-938 and FIG. 9I shows horizontal rotation for aspects 932-938.

The platform 500 can also use the position-based or motion based technique to display NFT collections. In certain embodiments, different views of products could be shown from viewing different directions with different types of information overlaid based on the aspect In certain embodiments, a user could potentially see different colors/styles of a product as the user moves.

In certain embodiments, the art mode can have several different display mode and different rules for different statuses. The art mode can have the following display modes including background mode, dynamic display mode, interactive display mode. When in background mode, the display may have an image playlist selected by user. If the playlist has more than one image, the platform 500 can randomly select and switch image from the playlist to display. When a human presence is detected, the platform 500 can confirm user whether to switch to dynamic display mode or interactive display mode. In dynamic display mode, the displayed images may be changed by lighting, time, date, background music/sound/speech. In interactive display mode, the displayed content will be updated by user's position or motion.

Although FIGS. 9A-9K illustrate example use cases 900-920, various changes made be made to FIGS. 9A-9K. For example, use cases 912 and 920 could be combined to rotate and age a portrait. In addition, the use cases 900-920 may be used in any other suitable environment and are not limited to the specific embodiments described above.

Figure 10:
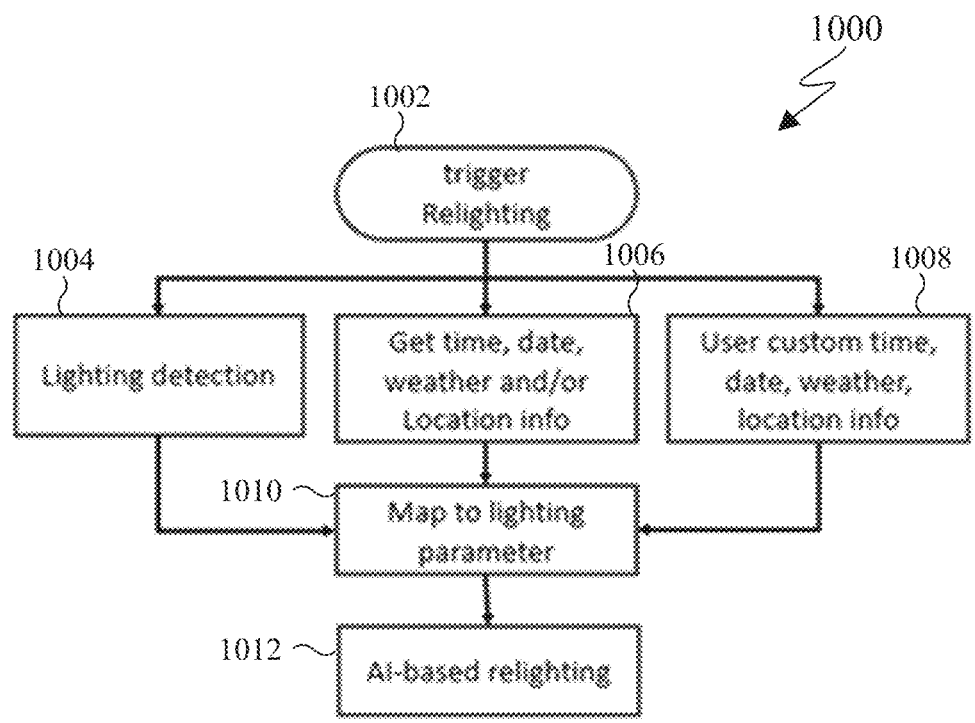
FIG. 10 illustrates an example method for view relighting according to this disclosure.

FIG. 10 illustrates an example method 1000 for view relighting according to this disclosure. For ease of explanation, the method 1000 of FIG. 10 is described as being performed using the platform 500 of FIG. 5. However, the method 1000 may be used with any other suitable system and any other suitable electronic device.

As shown in FIG. 10, the platform 500 can receive a relighting trigger in operation 1002. The relighting trigger can be received through a user interface or over a wired or wireless connection with an external electronic device.

The platform 500 can perform lighting detection in operation 1004. The lighting can be performed by one or more sensors coupled with an electronic device running the platform 500 or received from a sensor of an external electronic device. The one or more sensors can include an optical sensor, including photodiodes, photoresistors, phototransistors, photovoltaic light sensors, etc.

Once the trigger is received, the platform 500 can also receive the time, date, weather, and location information in operation 1006. The information can be measured directly by sensors of the electronic device utilizing platform 500 or from external electronic devices. In certain embodiments, the time and date information is stored on the electronic device operating the platform 500. The weather information can be received from a weather source, such as over the Internet or a weather application on the electronic device. The location information can be identified by a GPS sensor, tracked by an IMU of the electronic device, etc.

The platform 500 can also receive time, date, weather, and location information from a user in operation 1008. In certain embodiments, the platform 500 does not have access to or has received incorrect information. In other embodiments, the information received in operation 1008 is information for adjusting the light. For example, the user may want the relighting of an image to be changed from day, when the image is captured, to nighttime. The custom information received from the user can be used to determine the relighting operation.

The platform 500 can relight the display content in operation 1012. The relighting can be based on the lighting detected in the room, or generate the relighting effect based on the time, the date, the location and also the weather or even user customization. For example, the detected light can be mapped to a set of lighting parameters. In certain embodiments, the platform 500 may also generate the lighting parameters based the time, date, location and weather information. The platform can use an AI-based method to generate the corresponding relighting effect for the display images using the derived lighting parameters.

Although FIG. 10 illustrates one example of a method 1000 for view relighting, various changes may be made to FIG. 10. For example, while shown as a series of steps, various steps in FIG. 10 may overlap, occur in parallel, or occur any number of times.

Figure 11:
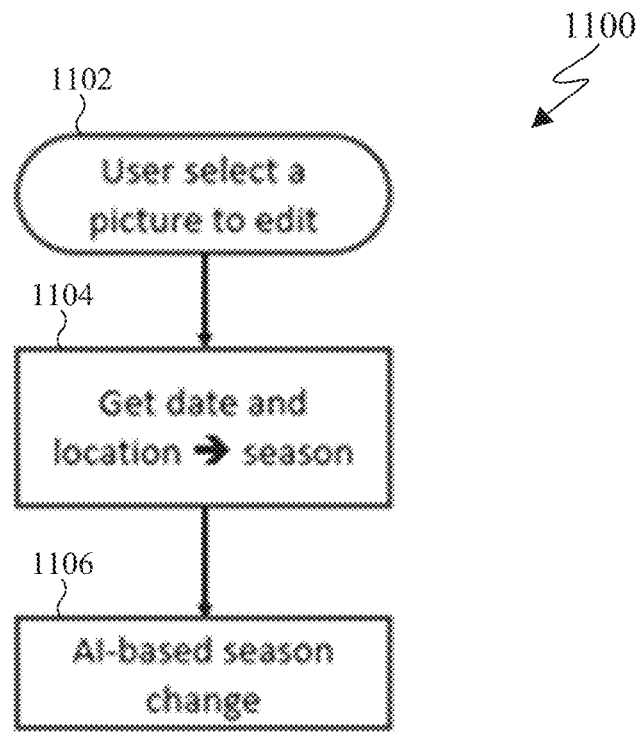
FIG. 11 illustrates an example method for season changing according to this disclosure.

FIG. 11 illustrates an example method 1100 for season changing according to this disclosure. For ease of explanation, the method 1100 of FIG. 11 is described as being performed using the platform 500 of FIG. 5. However, the method 1100 may be used with any other suitable system and any other suitable electronic device.

In certain embodiments, the platform 500 can use AI-based methods to update an image based on season information inferred from data and location or user selected season. Method 1100 can be used for the use case 902 shown in FIG. 9B. The platform 500 can receive a selection of an image for editing in operation 1102. The selection can be received through a user input from the user or through a wired or wireless connection with an external electronic device. The selection can include one or more images. The selection can also include one or more seasons to display as different aspect. The selection can also include a specific season as a default aspect or as an indication on which season the image was captured.

The platform 500 can perform an AI-based season change based on the received information and a position or motion of a user. When the user moves in one direction, the seasons can move forward. When the user moves in an opposite direction, the seasons can move backwards.

Although FIG. 11 illustrates one example of a method 1100 for season changing, various changes may be made to FIG. 11. For example, while shown as a series of steps, various steps in FIG. 11 may overlap, occur in parallel, or occur any number of times.

Figure 12A:
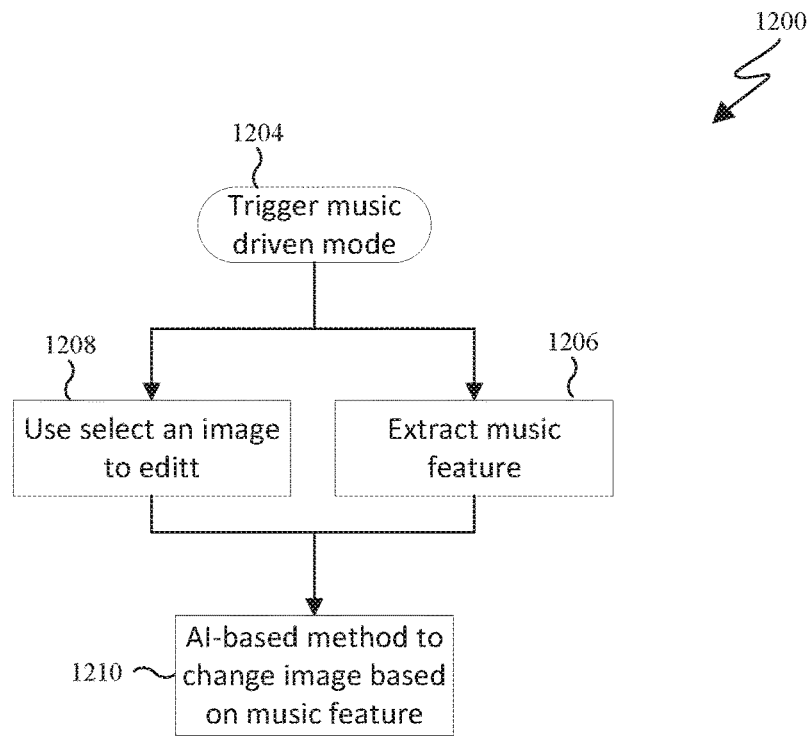
FIGS. 12A and 12B illustrate example methods for music driven changing according to this disclosure.
Figure 12B:
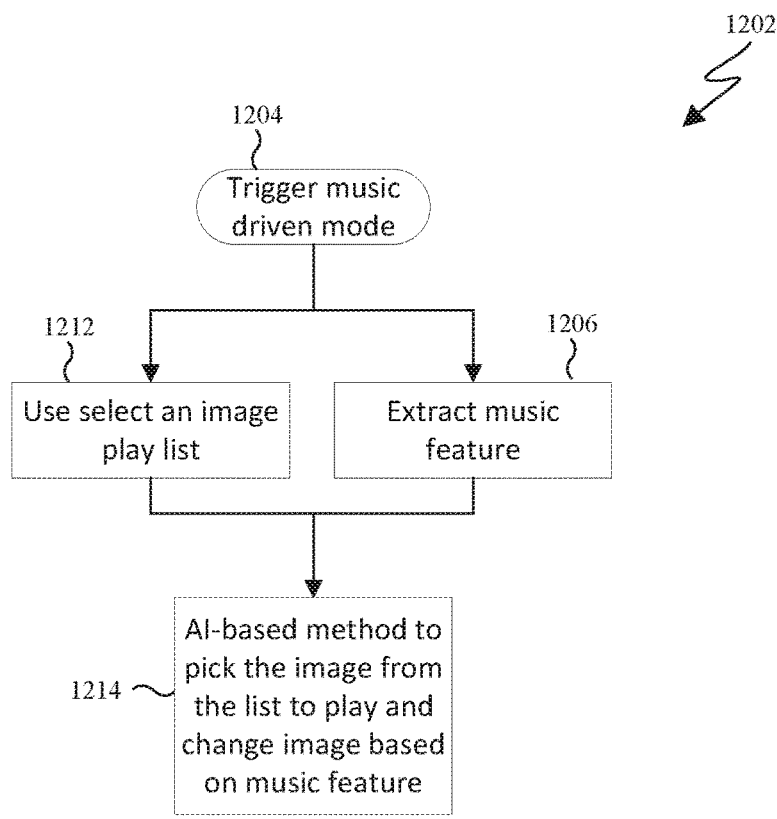

FIGS. 12A and 12B illustrate example methods 1200 and 1202 for music driven changing according to this disclosure. For ease of explanation, the methods 1200 and 1202 of FIGS. 12A and 12B are described as being performed using the platform 500 of FIG. 5. However, the methods 1200 and 1202 may be used with any other suitable system and any other suitable electronic device.

In certain embodiments, a music driven mode can be triggered in operation 1204. The music driven mode can be automatically triggers when music is detected or when a music selection is received by the platform 500. Once the music driven mode is triggered, the platform 500 can extract one or more music features in operation 1206. Music features can include changes in tempo, key changes, volume changes, or any other suitable music change or transition. The music features can be mapped to specific functions.

The platform 500 can receive a selection of an image for editing in operation 1208 and receive a selection of an image play list in operation 1212. A Frame TV implementing platform 500 can change the image or pick the image from a play list based on the music playing in the background. Based on the extract features, the platform 500 can have AI-based method automatically change an image in operation 1210 or pick image from the list to play in operation 1212.

Although FIG. 12 illustrates example methods 1200 and 1202 for music driven changing, various changes may be made to FIG. 12. For example, while shown as a series of steps, various steps in FIG. 12 may overlap, occur in parallel, or occur any number of times.

Figure 13A:
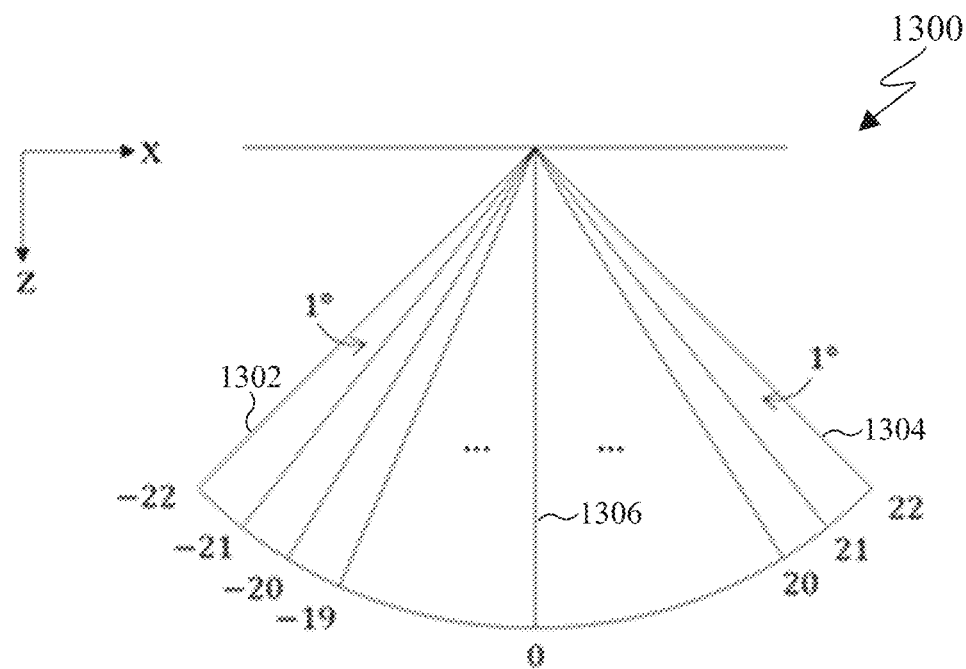
FIGS. 13A and 13B example view cone and view angle in accordance with this disclosure.
Figure 13B:
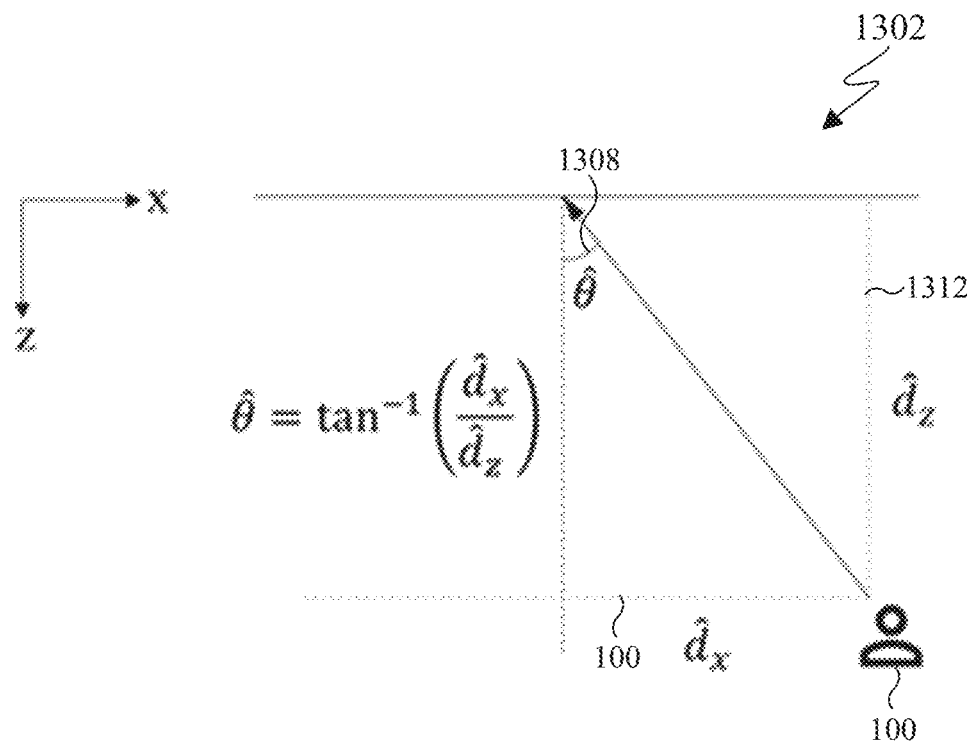

FIGS. 13A AND 13B example view cone 1300 and view angle 1302 in accordance with this disclosure. The embodiments of the view cone 1300 and view angle 1302 illustrated in FIGS. 13A and 13B are for illustration only. FIGS. 13A and 13B do not limit the scope of this disclosure to any particular implementation of an electronic device.

As shown in FIGS. 13A and 13B, 3D artwork by N image/views and associated metadata that is controlled by a total span angle of the view (e.g., $$\left[-\frac{\Phi}{2}, \frac{\Phi}{2}\right].$$

The platform 500 may change view or image depending upon a look-direction. The look-direction can be represented using the divided view cone as a simple example where N=45 spanning between a first look direction 1302 at −22° and a forty fifth look direction 1304 at 22°. A default look direction 1306 can be at 0°.

In certain embodiments, the platform 500 can estimate a viewer's look direction 1308 $\hat{\theta}$. The predicted $\hat{\theta}$ can be determined from an estimated first component direction 1310 $d_x$ and second component direction 1312 $d_z$. The platform 500 can use double exponential smoothing including the "change band" hysteresis filter on θ. The platform 500 can predict $d_x$ and $d_z$ using double exponential smoothing as two separate time series (and applying "change band" hysteresis filter on both).

In certain embodiments, $d_x$ and $d_z$ can be directly observed data. Instead of using the directly observed data as the time series, platform 500 can perform a prediction of velocities $\hat{v}_x$ and $\hat{v}_z$ using double exponential smoothing and estimate $d_x$ and $d_z$, which can be followed by a determination of θ. The platform 500 can filter both estimated velocities and positions, which should be smoother than either of the above two, but computationally, only slightly more expensive. The rendered image I(θ) can be based on the updated/changed θ ⊂ ℝ.

I(θ)=I(ϕ), where ϕ=⌊θ⌋ or ⌈θ⌉. I(⌊θ⌋), I(⌈θ⌉) are in the set of input images/views, where I(θ) represents a view obtained by interpolating the images I(⌊θ⌋) and I(⌈θ⌉). The platform 500 can apply video-frame interpolation or view-synthesis depending on the sparsity/density of input views. The platform 500 can obtain I(ϕ) but warp the image based on a predicted velocity and position using one of the several warping/reprojection techniques used in AR/VR (e.g., asynchronous time warp, asynchronous space warp, etc.).

In certain embodiments, besides using the detected motion along x axis to decide the viewport, the platform 500 can also utilize the user rotation, purple motion, hand gestures and etc. to change views.

Although FIGS. 13A and 13B illustrate example view cone 1300 and view angle 1302, various changes may be made to FIGS. 13A and 13B. For example, the sizes, shapes, and dimensions of the view cone 1300 and view angle 1302 and their individual components can vary as needed or desired. In addition, the view cone 1300 and view angle 1302 may be used in any other suitable display process and is not limited to the specific processes described above.

Figure 14:
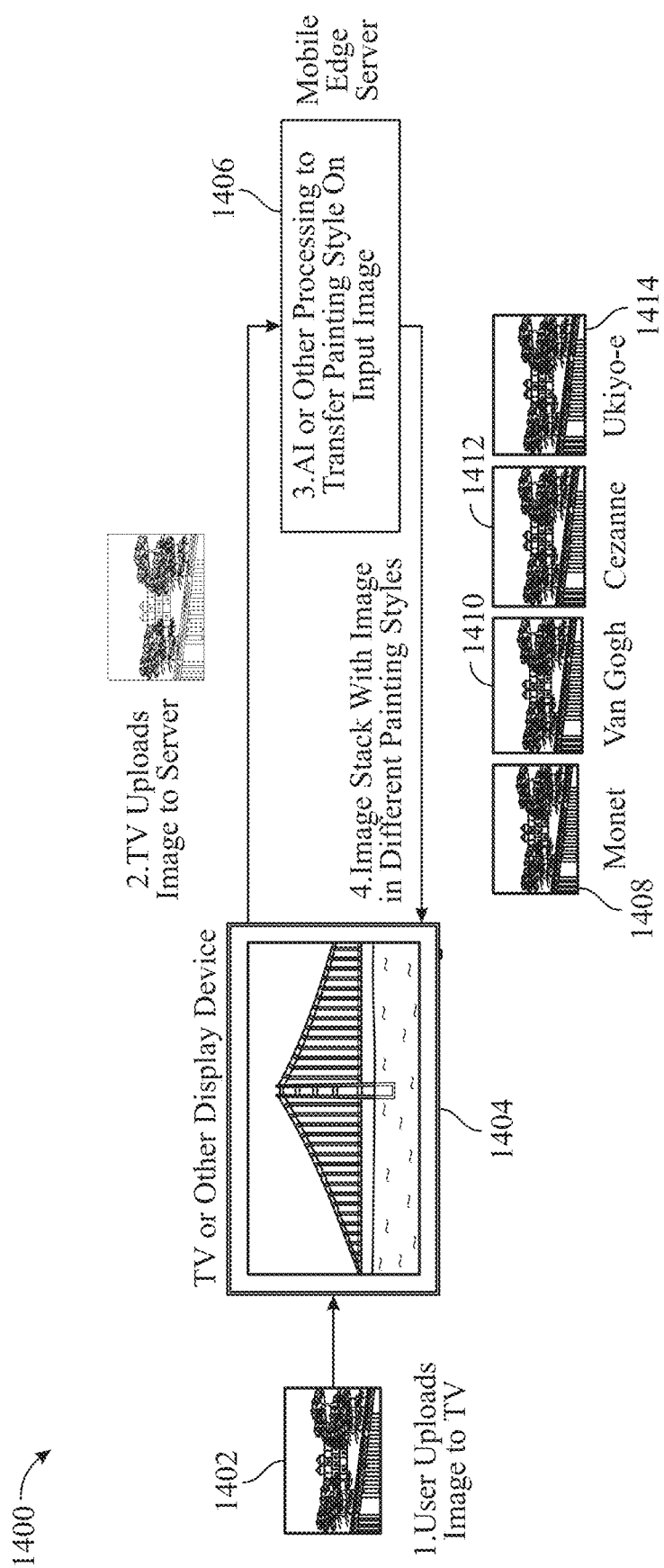
FIG. 14 illustrates an example server-based framework 1400 in accordance with this disclosure.

FIG. 14 illustrates an example server-base framework 1400 in accordance with this disclosure. The embodiment of the server-based framework 1400 illustrated in FIG. 14 is for illustration only. FIG. 14 does not limit the scope of this disclosure to any particular implementation of an electronic device.

In certain embodiments, the user can upload an image 1402 to the display devices 1404. The display device 1404 uploads the image to the server. The server 1406 can generate lively images 1408-1414 (different painting styles, different lighting conditions of the painting etc.) and send back the multiple images 1408-1414 corresponding to the input image 1402 to the display device 1404. The display device 1404 then uses the layers 402-406 of the platform 500 or other sensing modalities to display the stack of received images 1408-1414 based on user position/preference etc.

In certain embodiments, the user is able to activate the 3D art mode on a display device 1404 via voice input or other unique gestures. Or when the display device 1404 can activate the 3D art mode, AR art mode or other applications when it detects a person in the vicinity of the display device 1404.

Although FIG. 14 illustrates a server-based framework 1400, various changes may be made to FIG. 14. In addition, the server-based framework 1400 may be used in any other suitable display process and is not limited to the specific processes described above.

Figure 15:
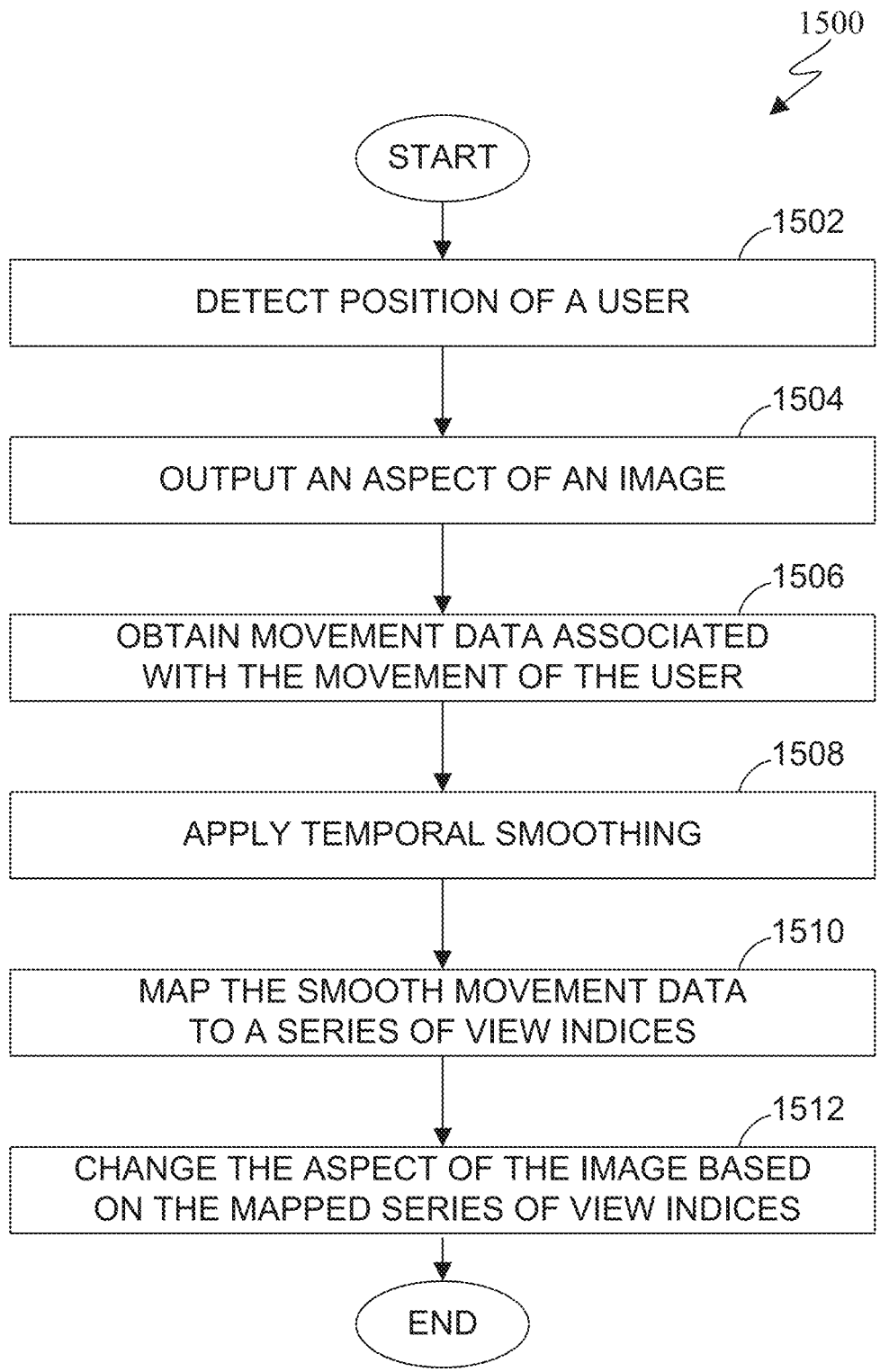
FIG. 15 illustrates an example method for 3D arts viewing on a display device according to this disclosure.

FIG. 15 illustrates an example method 1500 for 3D arts viewing on a display device according to this disclosure. For ease of explanation, the method 1500 of FIG. 15 is described as being performed using the platform 500 of FIG. 5. However, the method 1500 may be used with any other suitable system and any other suitable electronic device.

As shown in FIG. 15, The platform 500 can detect a position of a user at step 1502. The position of the user can be detected using one or more sensors of the platform 500. For example, the one or more sensors can include optical sensors, proximity sensors, etc.

In certain embodiments, the platform 500 can detect multiple users. The platform 500 can determine that a control user is a nearest user, a centered user, a first user to detect movement, etc. The aspect of the object can be controlled based on the control user determined by the platform 500. In certain embodiments, a user can be originally selected or selected after a determination of the platform 500. The platform 500 can control the aspect of the object based on position or movement of the control user until the control user is obstructed or not within range of the one or more sensors for a time greater than a threshold. For example, a control user could be not tracked for a period of five second before selection of a new control user.

The platform 500 can output an aspect of an image at step 1504. The aspect of the image can be output on a display based on a position of the user. The detected position of the user when the image is initially output can be a default position. In certain embodiments, a center of a field of view of the platform 500 for tracking the user can be a default position. The position of the user can be compared to the center of the field of view to determine an initial aspect of the object for display. The default aspect of the image can be based on a range of the one or more sensors. For example, when the sensors can detect a range from −22 degrees to +22 degree, the default aspect can be set to 0 degrees.

The platform 500 can obtain movement data associated with the movement of the user at step 1506. The one or more sensors can track a user movement from the initial position. In certain embodiments, the one or more sensors can track a current position and adjust the aspect of the object in real time. The detect position of the user can be mapped to a view index in a range of the one or more sensors.

The platform 500 can apply temporal smoothing to smooth the movement data at step 1508. The temporal smoothing can remove jitters from the movement data for a constant transition between movement points. The temporal smoothing can reduce noise and remove jitter from the movement data.

The platform 500 can map the smoothed movement data to a series of view indices at step 1510. The movement data may contain jitters due to sensor quality or other factors. Temporal smoothing can remove the jitters for more aesthetical changes of the aspects.

The platform 500 can change the aspect of the image based on the mapped series of view indices. In certain embodiments, the aspect of the image can be changed based on the mapped index from the default aspect.

As non-limiting examples, the aspects can includes rotating an image, switching an image between different seasons, converting a photo image to different styles of paints, generating a live animation of the image, visualizing age progression of an image, visualizing expression changes of an image, visualizing portrait face rotations of the image, etc.

In certain embodiments, the platform 500 can receive a user input for resetting an image to a default aspect regardless of user position or motion data. The platform 500 can render the image in a default aspect on the display based on the received user input.

Although FIG. 15 illustrates one example of a method 1500 for 3D art viewing on a display device, various changes may be made to FIG. 15. For example, while shown as a series of steps, various steps in FIG. 15 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus for three dimensional (3D) arts viewing, the apparatus comprising:
   one or more sensors; and
   a processor operably coupled to the one or more sensors, the processor configured to:
      detect, using the one or more sensors, a position of a user,
      output, for display, an aspect of an image based on the position of the user,
      obtain, using the one or more sensors, movement data associated with a movement of the position of the user in relation to the one or more sensors,
      apply temporal smoothing to smooth the movement data associated with the movement of the position of the user in relation to the one or more sensors,
      map the smoothed movement data to a series of view indices, and
      change the aspect of the image for display based on the mapped series of view indices.

2. The apparatus of claim 1, wherein to change the aspect of the image the processor is configured to perform at least one of:
rotate the image,
switch the image between different seasons,
convert a photo image to different styles of paintings,
generate a live animation of the image,
visualize age progression of the image,
visualize expression changes of the image, and
visualize portrait face rotations of the image.

3. The apparatus of claim 1, wherein the detected position of the user is set as a default aspect of the image.

4. The apparatus of claim 1, wherein:
a default aspect of the image is based on a range of the one or more sensors, and
the processor is further configured to:
map the detected position of the user to a view index in the range of the one or more sensors, and
change the aspect of the image based on the mapped view index from the default aspect.

5. The apparatus of claim 1, wherein the processor is further configured to:
receive an input from the user, and
revert the image to a default aspect based on receiving the input from the user.

6. The apparatus of claim 1, wherein, when multiple users are detected by the one or more sensors, the processor is configured to:
determine a nearest user of the multiple users, and
change the aspect of the image based on movement data of the nearest user.

7. The apparatus of claim 6, wherein the processor is further configured to:
receive an input selecting a first user of the multiple users, and
change the aspect of the image based on movement data of the first user of the multiple users.

8. A method for three dimensional (3D) arts viewing, the method comprising:
detecting, using one or more sensors of an electronic device, a position of a user;
outputting, for display, an aspect of image based on the position of the user;
obtaining, using the one or more sensors, movement data associated with a movement of the position of the user in relation to the one or more sensors;
applying temporal smoothing to smooth the movement data associated with the movement of the position of the user in relation to the one or more sensors;
mapping the smoothed movement data to a series of view indices; and
changing the aspect of the image for display based on the mapped series of view indices.

9. The method of claim 8, wherein changing the aspect of the image comprises performing at least one of:
rotating the image,
switching the image between different seasons,
converting a photo image to different styles of paintings,
generating a live animation of the image,
visualizing age progression of the image,
visualizing expression changes of the image, and
visualizing portrait face rotations of the image.

10. The method of claim 8, wherein the detected position of the user is set as a default aspect of the image.

11. The method of claim 8, wherein:
a default aspect of the image is based on a range of the one or more sensors, and
the method further comprises:
mapping the detected position of the user to a view index in the range of the one or more sensors, and
changing the aspect of the image based on the mapped view index from the default aspect.

12. The method of claim 8, further comprising:
receiving an input from the user, and
reverting the image to a default aspect based on receiving the input from the user.

13. The method of claim 8, further comprising, when multiple users are detected by the one or more sensors:
determining a nearest user of the multiple users, and
changing the aspect of the image based on movement data of the nearest user.

14. The method of claim 13, further comprising:
receiving an input selecting a first user of the multiple users, and
changing the aspect of the image based on movement data of the first user of the multiple users.

15. A non-transitory computer readable medium containing instructions that when executed cause a processor to:
detect, using one or more sensors of an electronic device, a position of a user;
output, for display, an aspect of image based on the position of the user;
obtain, using the one or more sensors, movement data associated with a movement of the position of the user in relation to the one or more sensors;
apply temporal smoothing to smooth the movement data associated with the movement of the position of the user in relation to the one or more sensors;
map the smoothed movement data to a series of view indices; and
change the aspect of the image for display based on the mapped series of view indices.

16. The non-transitory computer readable medium of claim 15, wherein the instructions that when executed cause the processor to change the aspect of the image comprise instructions that when executed cause the processor to perform at least one of:
rotate the image,
switch the image between different seasons,
convert a photo image to different styles of paintings,
generate a live animation of the image,
visualize age progression of the image,
visualize expression changes of the image, and
visualize portrait face rotations of the image.

17. The non-transitory computer readable medium of claim 15, wherein the detected position of the user is set as a default aspect of the image.

18. The non-transitory computer readable medium of claim 15, wherein:
a default aspect of the image is based on a range of the one or more sensors, and
the instructions further cause the processor to:
map the detected position of the user to a view index in the range of the one or more sensors, and
change the aspect of the image based on the mapped view index from the default aspect.

19. The non-transitory computer readable medium of claim 15, wherein the instructions further cause the processor to:
receive an input from the user, and
revert the image to a default aspect based on receiving the input from the user.

20. The non-transitory computer readable medium of claim 15, wherein, when multiple users are detected by the one or more sensors, the instructions further cause the processor to:
   determine a nearest user of the multiple users, and
   change the aspect of the image based on movement data of the nearest user.

* * * * *